US010637557B2

(12) United States Patent
Ashworth

(10) Patent No.: US 10,637,557 B2
(45) Date of Patent: Apr. 28, 2020

(54) MULTI-AMPLIFIER REPEATER SYSTEM FOR WIRELESS COMMUNICATION

(71) Applicant: WILSON ELECTRONICS, LLC, St. George, UT (US)

(72) Inventor: Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/947,684

(22) Filed: Apr. 6, 2018

(65) Prior Publication Data
US 2018/0294866 A1    Oct. 11, 2018

Related U.S. Application Data

(60) Provisional application No. 62/482,828, filed on Apr. 7, 2017.

(51) Int. Cl.
H04B 10/29      (2013.01)
H04B 10/80      (2013.01)
H04B 7/155      (2006.01)
H04B 10/25      (2013.01)
H04B 7/26       (2006.01)

(52) U.S. Cl.
CPC ..... H04B 7/15507 (2013.01); H04B 7/15535 (2013.01); H04B 7/2606 (2013.01); H04B 10/2503 (2013.01); H04B 10/807 (2013.01)

(58) Field of Classification Search
CPC .............................. H04B 10/29; H04B 10/807
See application file for complete search history.

(56) References Cited

U.S. PATENT DOCUMENTS

| 4,776,032 | A  | 10/1988 | Odate et al. |
| 5,303,395 | A  | 4/1994  | Dayani |
| 5,737,687 | A  | 4/1998  | Martin et al. |
| 5,777,530 | A  | 7/1998  | Nakatuka |
| 5,835,848 | A  | 11/1998 | Bi et al. |
| 6,005,884 | A  | 12/1999 | Cook et al. |
| 6,711,388 | B1 | 3/2004  | Neitiniemi |
| 6,889,033 | B2 | 5/2005  | Bongfeldt |
| 6,990,313 | B1 | 1/2006  | Yarkosky |
| 7,035,587 | B1 | 4/2006  | Yarkosky |

(Continued)

FOREIGN PATENT DOCUMENTS

EP    1525678 B1    7/2008
KR    10-0974456 B1    8/2010

(Continued)

OTHER PUBLICATIONS

International Search Report dated 27 Jul. 2018, in International Application No. PCT/US2018/026598, filed Apr. 6, 2018; 3 pages.

(Continued)

Primary Examiner — Shi K Li
(74) Attorney, Agent, or Firm — Thorpe North & Western

(57) ABSTRACT

Technology for a multi-repeater system including wireless transmission of power from a first repeater to a second repeater is disclosed. A first and second repeater can be disposed opposite each other about a structural element. Wireless power can be transmitted from the first repeater through the structural element to the second repeater for use by the second repeater.

36 Claims, 15 Drawing Sheets

(56) References Cited

U.S. PATENT DOCUMENTS

| | | |
|---|---|---|
| 7,221,967 B2 | 5/2007 | Van Buren et al. |
| 7,299,005 B1 | 11/2007 | Yarkosky et al. |
| 7,974,573 B2 | 7/2011 | Dean |
| 2002/0044594 A1 | 4/2002 | Bongfeldt |
| 2003/0123401 A1 | 7/2003 | Dean |
| 2004/0137854 A1 | 7/2004 | Ge |
| 2004/0146013 A1 | 7/2004 | Song et al. |
| 2004/0166802 A1 | 8/2004 | McKay, Sr. et al. |
| 2004/0219876 A1* | 11/2004 | Baker ............ H04B 7/15535 455/7 |
| 2004/0235417 A1 | 11/2004 | Dean |
| 2005/0118949 A1 | 6/2005 | Allen et al. |
| 2006/0084379 A1 | 4/2006 | O'Neill |
| 2007/0071128 A1 | 3/2007 | Meir et al. |
| 2007/0155314 A1* | 7/2007 | Mohebbi ........... H04B 7/15507 455/11.1 |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0278237 A1 | 11/2008 | Blin |
| 2009/0135745 A1 | 5/2009 | Gainey et al. |
| 2011/0151775 A1 | 6/2011 | Kang et al. |
| 2016/0134356 A1* | 5/2016 | Rappaport ......... H04B 7/15507 370/315 |

FOREIGN PATENT DOCUMENTS

| | | |
|---|---|---|
| WO | WO 2008147506 A1 | 12/2008 |
| WO | WO 2017031315 A1 | 2/2017 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50-8000 MHz"; Data Sheet; (2010); 12 pages.

HMC909LP4E; "RMS Power Detector Single-Ended, DC05.8 GHz"; Data Sheet; (2010); 21 pages.

PIC16F873; "28/40-Pin 8-Bit CMOS Flash Microcontrollers"; (2001); Data Sheet; 218 pages.

\* cited by examiner

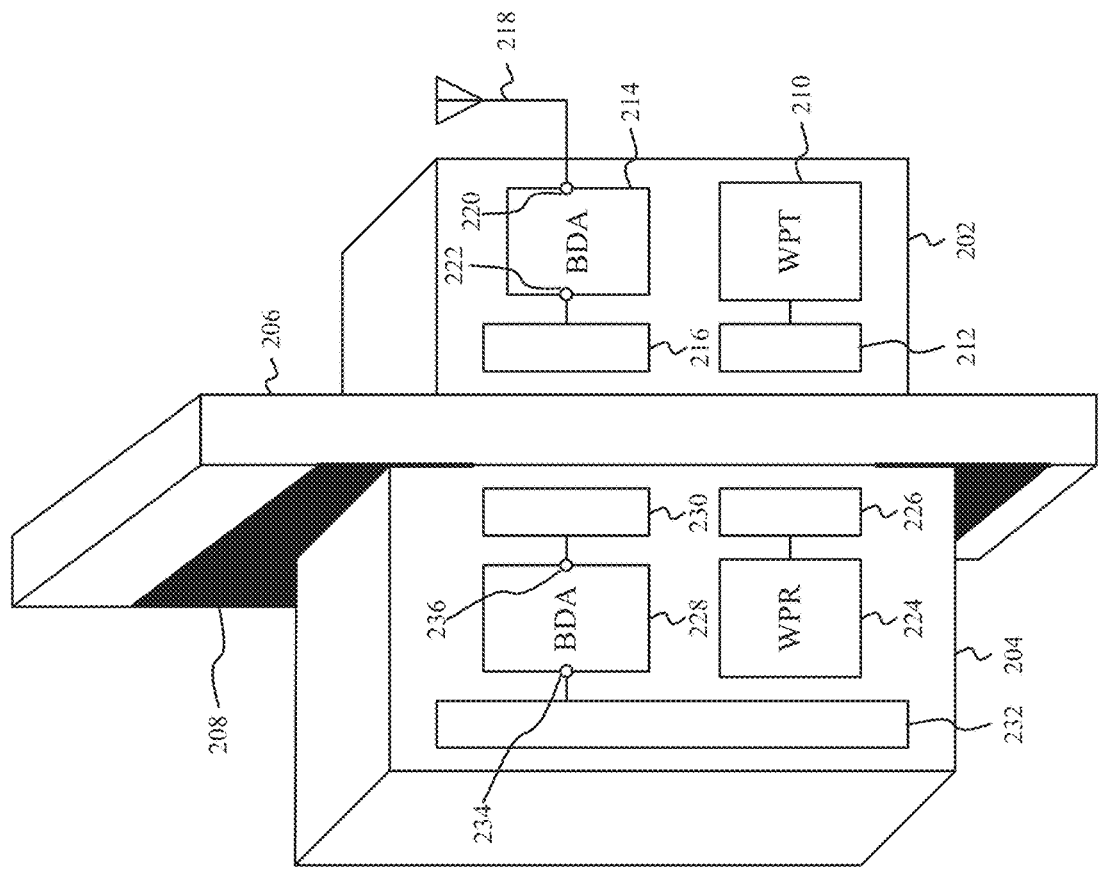
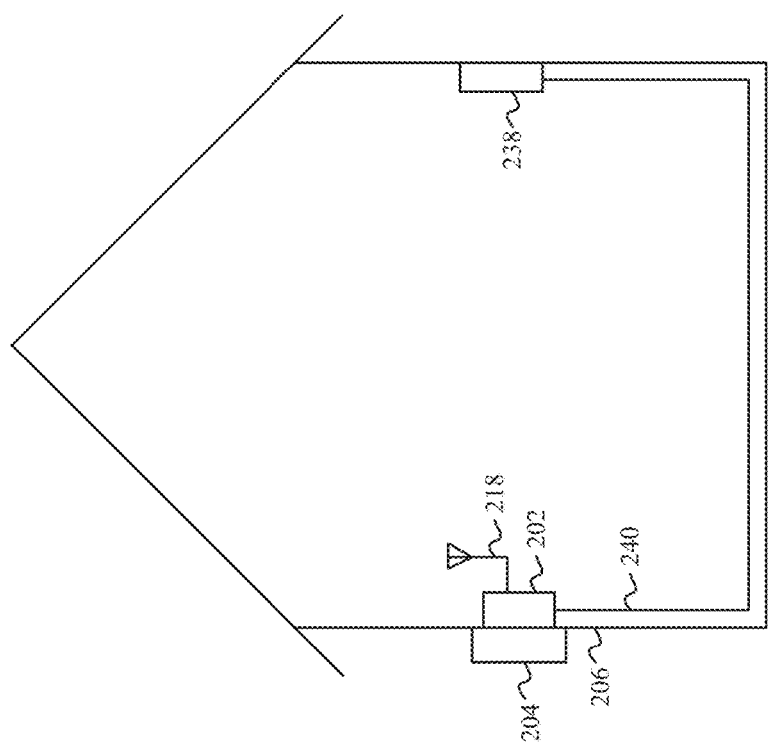
FIG. 2B
FIG. 2A

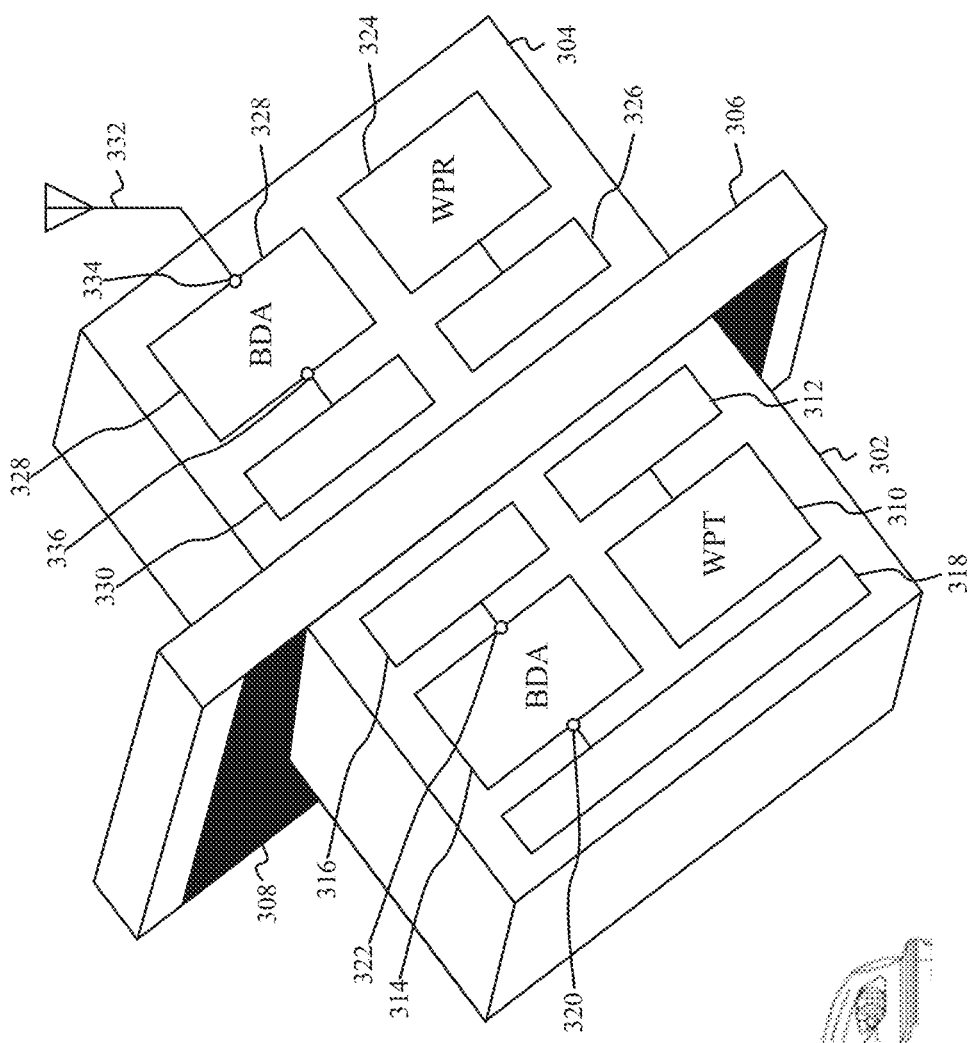
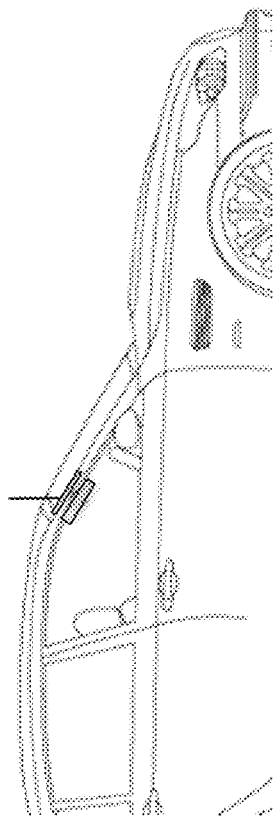
FIG. 3A
FIG. 3B
FIG. 3C

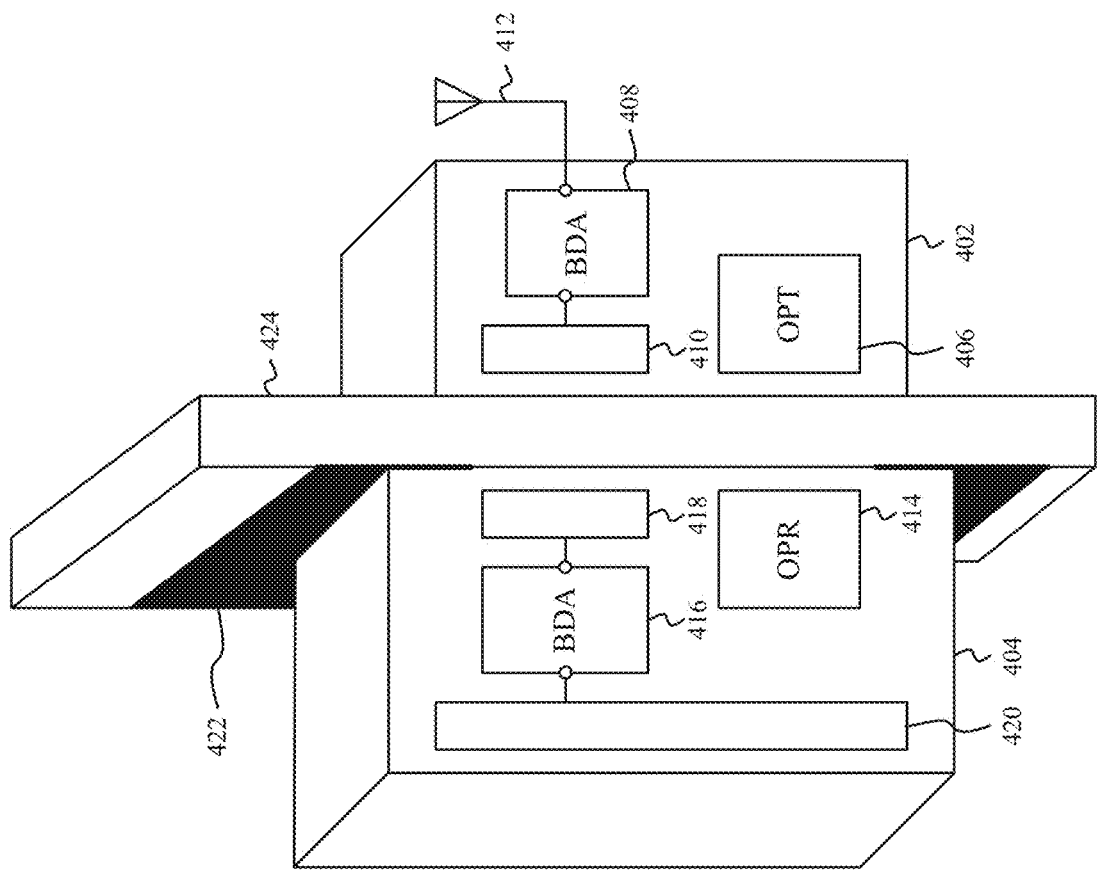
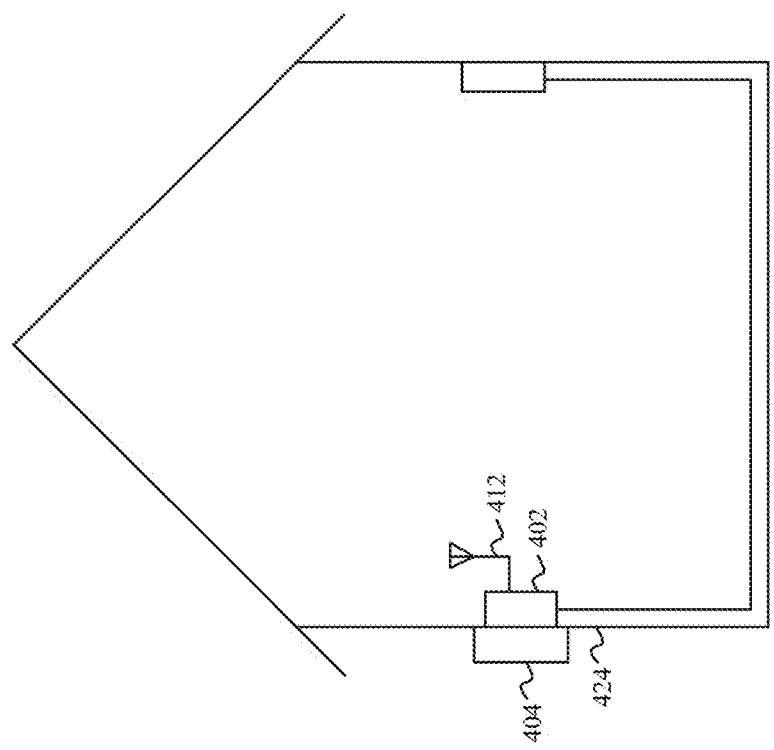
FIG. 4B
FIG. 4A

MULTI-AMPLIFIER REPEATER SYSTEM FOR WIRELESS COMMUNICATION

RELATED APPLICATIONS

The present application claims the benefit of U.S. Provisional Patent Application No. 62/482,828 filed Apr. 7, 2017, the entire specification of which is hereby incorporated by reference in its entirety for all purposes.

FIELD OF THE INVENTION

The present technology relates generally to RF transmission, and in particular control of relay amplifier gain.

BACKGROUND

Wireless communication systems, such as cellular telephone systems, have become common throughout the world. A wireless repeater or booster is a radio frequency (RF) device used to amplify wireless communication signals in both uplink and downlink communication channels, as illustrated in FIG. 1. The uplink channel is generally referred to as the direction from one or more user equipment (UE) 110 to a base station (BS) 120. The downlink channel is generally referred to as the direction from the base station 120 to the user equipment 110. For a wireless telephone system, the base station 120 may be a cell tower, and the user equipment 110 may be one or more smart phones, tablet, laptop and desktop computers, multimedia devices such as a television or gaming system, cellular internet of things (CIoT) devices, or other types of computing devices. The repeater 130 typically includes a signal amplifier 140 coupled between two antennas, a user-side antenna 150 and a service-side antenna 160. The user equipment 110 may be operating within a structure, while the repeater 130 may be located inside or outside the structure 170. The structure 170 may introduce signal losses that deleteriously affect the user equipment 110 and/or the repeater 130. In addition, constraints imposed by government agencies, industry standards, or similar regulatory entities may limit the amount of amplification (gain), the maximum output power, the output noise, and other parameters associated with the operation of the repeater 130. Therefore, there is a continuing need for improved wireless repeaters.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 2A and 2B depict a wireless system, in accordance with an example;

FIGS. 3A-3C depict a wireless system, in accordance with another example;

FIGS. 4A and 4B depict a wireless system, in accordance with yet another example;

Figure 1:
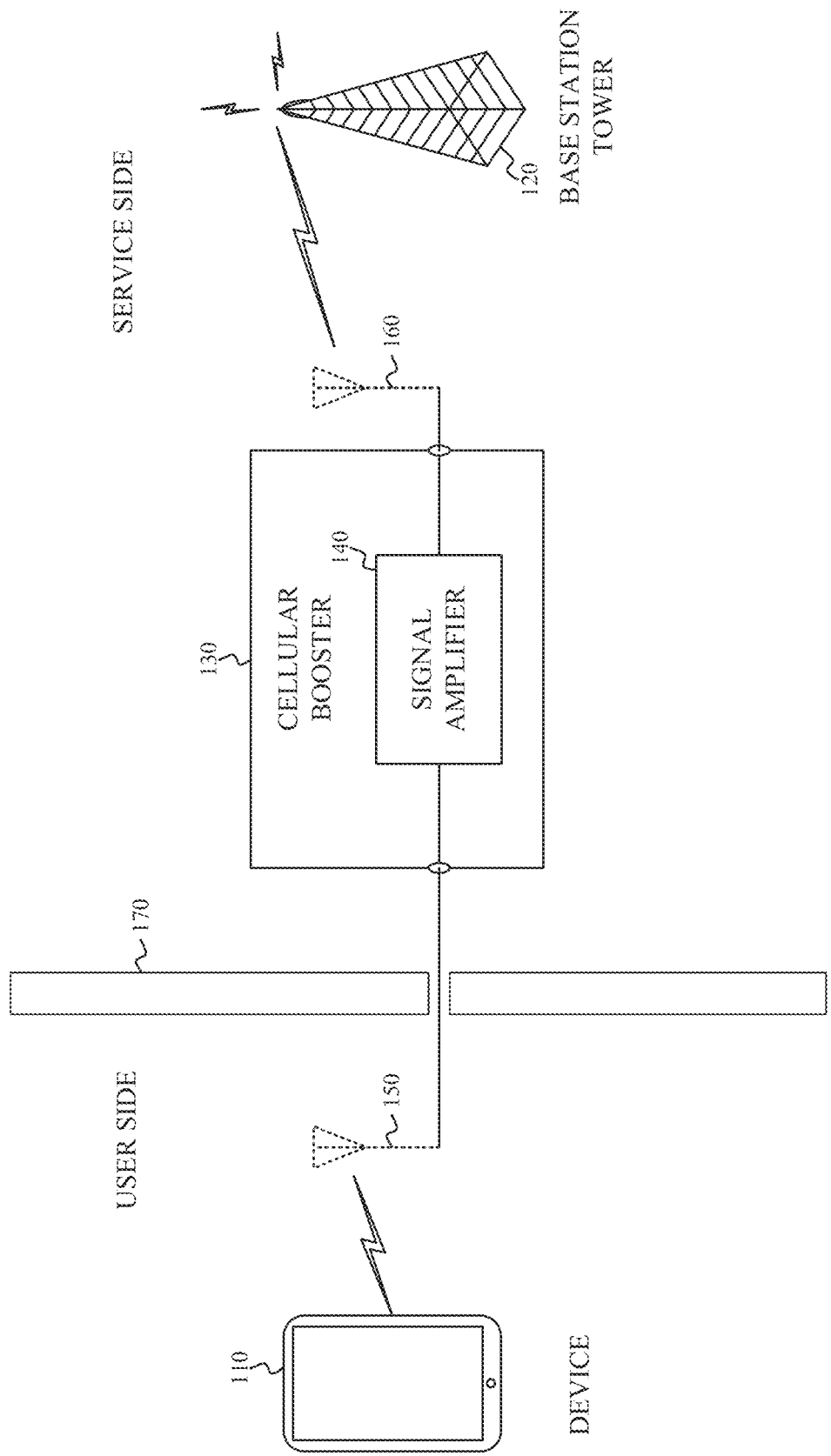
FIG. 1 depicts a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a multi-repeater system may include first and second repeaters configured to automatically receive, amplify and retransmit on a bi-directional basis the signals received from base, fixed, mobile, or portable stations, with no change in frequency or authorized bandwidth. The repeaters can provide improved wireless coverage within a limited area such as a home, car, boat or recreational vehicle (RV). The repeaters can operate on the frequencies and in the market areas of a specified licensee service provider, or on the frequencies or in the market areas of multiple licensee service providers. The repeaters can operate in a fixed location, such as a house or building, or in a moving vehicle such as a car or boat.

In one aspect, the first and second repeaters can include respective first and second wireless power units. In one aspect, the first wireless power unit includes a wireless power transmitter and a first power coupler, and the second wireless power unit includes a wireless power receiver and a second power coupler. The wireless power transmitter can be configured to convert a portion of DC or AC electrical power received from a power source to a RF power signal. The first power coupler can be configured to transmit the RF power signal through a structural element to the second power coupler. The wireless power receiver can be configured to convert the received RF power signal to DC or AC electrical power. The second repeater can be configured to be powered by the DC or AC electrical power from the wireless power receiver.

carrier bands. In one instance, the uplink 3GPP LTE signals may operate at a first frequency band and the downlink 3GPP LTE signal may operate at a second frequency band. In one instance the operating bands of the RF communication signals may include:

TABLE 1

| | Bands of Operation | | | | | |
|---|---|---|---|---|---|---|
| | Uplink | | | Downlink | | |
| Band | Fmin (MHz) | Fmax (MHz) | Fc (MHz) | Fmin (MHz) | Fmax (MHz) | Fc (MHz) |
| II | 1850.0 - | 1910.0 | 1880.0 | 1930.0 - | 1990.0 | 1960.0 |
| IV | 1710.0 - | 1755.0 | 1732.5 | 2110.0 - | 2155.0 | 2132.5 |
| V | 824.0 - | 849.0 | 836.5 | 869.0 - | 894.0 | 881.5 |
| XII | 699.0 - | 716.0 | 707.5 | 729.0 - | 746.0 | 737.5 |
| XIII | 776.0 - | 787.0 | 781.5 | 746.0 - | 757.0 | 751.5 |

In another aspect, the first wireless power unit can include an optical power transmitter and the second wireless power unit can include an optical power receiver. The optical power transmitter can be configured to convert a portion of DC or AC electrical power received from a power source to an optical signal and transmit the optical signal through a structural element. The optical power receiver can be configured to receive the optical signal and convert the optical signal to the DC or AC electrical power. The second repeater can be configured to be powered by DC or AC electrical power from the optical power receiver.

FIGS. 2A and 2B depict a wireless system, in accordance with an example. In one aspect, the wireless system includes a first repeater 202 and a second repeater 204. The first and second repeaters 202, 204 are adapted for disposition opposite each other about a structural element 206, such as a wall, window or similar element. In one instance, the first repeater 202 can be an inside repeater adapted for placement within a structure, and the second repeater 204 can be an outside repeater adapted for placement outside the structure. The first repeater 202 may also be referred to as a device/client repeater, subscriber side repeater or service side repeater, while the second repeater 204 may also be referred to as a wireless network repeater, provider side repeater or donor side repeater. In one aspect, the various functions of the repeaters 202, 204, can be implemented in hardware, firmware, software stored in memory and executed by one or more processing units, and/or any combination thereof.

In one aspect, the first repeater 202 can include a wireless power transmitter (WPT) 210, a power coupler 212, one or more bi-directional amplifiers (BDA) 214, a RF coupling antenna 216, and one or more optional transmission antennas 218. In one aspect, the second repeater 204 can include a wireless power receiver (WPR) 224, a power coupler 226, one or more bi-directional amplifiers (BDA) 228, one or more RF coupling antennas 230, and one or more optional transmission antennas 232. The wireless system may optionally include one or more conductive films 208 for disposition between the first and second repeaters 202, 204.

In one aspect, the one or more bi-directional amplifiers 214 of the first repeater 202 can be configured to amplify one or more RF communication signals. In one instance, the RF communication signals can be cellular telephone RF signals, such as a Third-Generation Partnership Project (3GPP) Long Term Evolved (LTE) signals. In one instance, the one or more bi-direction amplifier 214 can be configured to amplify both uplink and downlink 3GPP LTE signals of one or more In one aspect, the one or more transmission antennas 218 can be integral to the first repeater 214 (e.g., internal or directly coupled external transmission antenna). Alternatively, the one or more transmission antennas 218 may be separate from the first repeater 202, but removably coupled to the bi-directional amplifier 214 (e.g., remote external transmission antenna), optionally by one or more wired communication links (e.g., coaxial cable). The transmission antennas 218 may be a directional antenna or an omni-directional antenna.

In one aspect, the one or more bi-directional amplifiers 214 of the first repeater 202 can include one or more RF transmission ports 220 and one or more RF coupling ports 222. The one or more transmission antennas 218 can be coupled to the respective one or more RF transmission ports 220, and the one or more RF coupling antennas 216 can be coupled to the respective one or more RF coupling ports 222 of the one or more bi-directional amplifiers 214 of the first repeater 202.

In one aspect, the one or more bi-directional amplifiers 228 of the second repeater 204 can be configured to amplify one or more RF communication signals. In one instance, the one or more bi-direction amplifiers 228 can be configured to amplify both uplink and downlink 3GPP LTE signals.

In one aspect, the one or more transmission antennas 232 can be integral to the second repeater 204 (e.g., internal or directly coupled external transmission antenna). Alternatively, the one or more transmission antennas 232 may be separate from the second repeater 204, but coupled to the bi-directional amplifier 228 (e.g., remote external transmission antenna), optionally by one or more wired communication links (e.g., coaxial cable). The transmission antennas 232 may be a directional antenna or an omni-directional antenna.

In one aspect, the bi-directional amplifier 228 can include one or more RF transmission port 234 and one or more RF coupling ports 236. The one or more transmission antennas 232 can be coupled to the respective one or more RF transmission ports 234, and the one or more power couplers 226 can be coupled to the respective one or more RF coupling ports 236 of the bi-directional amplifier 228 of the second repeater 204.

In one aspect, the bi-directional amplifier 228 of the second repeater can boost one or more RF communication signal received from and transmitted to a Base Station (BS) (e.g., service provider cellphone tower). The base station can be a node of a mobile phone network, such as a 3GPP LTE evolved NodeB (eNB). In one aspect, the second repeater 204 and the one or more transmission antennas 232 set the noise figure and increase performance. The bi-directional amplifier 228 can improve the gain and/or noise-power on uplink and/or downlink communication RF signals, at the RF transmission port 236 of the bi-directional amplifier 228, to increase the range and/or increase the signal strength of RF communication signal between the second repeater 204 and the base station of a service provider. On the downlink path the second repeater 204 can preserve the signal-to-noise ratio and can set the noise figure for the system at a much lower level than otherwise. On the uplink, the second repeater 204 enables a much stronger signal to be transmitted and therefore reach the base station in more cases. In some instances, the gain or noise power as measured at the RF transmission port 234 or transmission antenna 232 of the second repeater 204 can be constrained by a government agency, an industry standard, or similar regulatory entity. Accordingly, the bi-directional amplifier 228 of the second repeater 204 can be configured to provide a gain or noise power level as measured at the RF transmission port 234 or transmission antenna 232 of the second repeater 204 to comply with such constrains. In one aspect, the bi-directional amplifier 228 can be configured to control the uplink and downlink power supplied by the bi-directional amplifier 228 independently.

In one aspect, the structural element 206, such as a wall, door, window or similar element can appreciably reduce the signal strength of RF signals entering a structure such as a home, office building, or car. Therefore, in one aspect, the bi-directional amplifier 214 of the first repeater 202 and/or the bi-directional amplifier 228 of the second repeater 204 can boost the one or more RF communication signals transmitted through the structural element 206. The bi-directional amplifier 214 of the first repeater 202 and/or the bi-directional directional amplifier 228 of the second repeater 204 can improve the gain and/or noise power on uplink and/or downlink communication RF signals, at the RF coupling port 222 of the bi-directional amplifier 214 and/or at the RF coupling port 236 of the bi-directional amplifier 228, to compensate for the loss through the structural element 206 which can exceed 20-30 dB. The gain or noise power of at the RF coupling port 222 of the bi-directional amplifier 214 and/or at the RF coupling port 236 of the bi-directional amplifier 228 can be selected such that the losses introduced by the structural element 206 reduces feedback through the one or more transmission antennas 218 of the first repeater 202 and/or the transmission antenna 232 of the second repeater 204.

In one aspect, the bi-directional amplifier 214 of the first repeater 202 can transmit the RF communication signals, with little or no boost, to one or more User Equipment (UE) within the structure. Optionally, the bi-directional amplifier 214 of the first repeater 202 can boost the one or more RF communication signals for transmission to the one or more UEs. The UEs can include smart phones, tablet computing devices, laptop computers, multimedia devices such as televisions or gaming systems, internet of things (IOT) devices, or other types of computing devices that are configured to provide text, voice, data, or other types of digital or analog communication over wireless communication. The bi-directional amplifier 214 can improve the gain and/or noise power on uplink and/or downlink communication RF signals, at the RF transmission port 220 of the bi-directional amplifier 214, to increase the range and/or increase the signal strength of RF communication signal between the first repeater 202 and one or more UEs within the structure. In some instances, the gain or noise power as measured at the RF transmission port 220 or transmission antenna 218 of the first repeater 202 can be constrained by a government agency, an industry standard, or similar regulatory entity. Accordingly, the bi-directional amplifier 214 of the first repeater 202 can be configured to provide a gain or noise power level as measured at the RF transmission port 220 or transmission antenna 218 of the first repeater 202 to comply with such constrains. In one aspect, the bi-directional amplifier 214 can be configured to control the uplink and downlink power supplied by the bi-directional amplifier 214 independently.

In one instance, the bi-directional amplifier 228 of the second repeater 204 can provide approximately 30-40 dB of gain. In addition, the one or more transmission antennas 232 of the second repeater 204 can be an antenna integral to the second repeater 204. The integral antenna can be a directional panel antenna. The bi-directional amplifier 214 of the first repeater can provide approximately 50-60 dB of gain. In addition, the transmission antenna of the first repeater 202 can be an external antenna coupled to the first repeater 202 by a wired communication link 240. A directional transmission antenna 232 can be placed on the structure 206 pointing toward the base station of the service provider to improve the transmission and reception of the RF communication signal by the second repeater 204. In addition, a directional transmission antenna 232 can be pointed away from the first repeater 202 to reduce the feedback between the transmission antennas 218, 232, between the coupling antenna 216 of the first repeater and the transmission antenna 232 of the second repeater, and/or between the coupling antenna 230 of the second repeater 204 and the transmission antenna 218 of the first repeater 202. In addition, by placing the transmission antenna 218 coupled to the first repeater 202 spaced apart from the first repeater 202 (e.g., in another room of a house or office building) feedback between the transmission antennas 218, 232, between the coupling antenna 216 of the first repeater and the transmission antenna 232 of the second repeater, and/or between the coupling antenna 230 of the second repeater 204 and the transmission antenna 218 of the first repeater 202 can be reduced.

In another instance, the bi-directional amplifier 228 of the second repeater 204 can provide approximately 30-50 dB of gain, and the bi-directional amplifier 214 of the first repeater can provide approximately 30-50 dB of gain. In addition, the transmission antennas 218, 232 of the first and second repeaters 202, 204 can be integral antennas. The integral antennas can both be directional antennas that can reduce the feedback between the transmission antennas 218, 232, between the coupling antenna 216 of the first repeater and the transmission antenna 232 of the second repeater, and/or between the coupling antenna 230 of the second repeater 204 and the transmission antenna 218 of the first repeater 202.

In yet another instance, the bi-directional amplifier 228 of the second repeater 204 can provide approximately 30-40 dB of gain. In addition, the one or more transmission antennas 232 of the second repeater 204 can be an antenna integral to the second repeater 204. The integral antenna can be a directional panel antenna. The bi-directional amplifier 214 of the first repeater 202 can provide approximately 50-60 dB of gain. In addition, bi-directional amplifier 214 of the first repeater 202 can be coupled to a third repeater 238 by a wired RF communication link 240. The third repeater 238 can provide an additional 30-50 dB of gain. The gain of the first repeater 202 and/or third repeater 238 can also compensate for transmission loss across the wired RF communication link 240.

In one aspect, the amount of gain provided by the first repeater 202 and/or the second repeater 204 can be based upon the transmission loss across the structural element 206. In one aspect, the first and second repeater 202, 204 can use Radio Frequency (RF) reference signals or RF communication signals to determine the transmission loss across the structural element 206 coupling the repeaters. In one aspect, the second repeater 204 can further include a signal generator. The first repeater 202 can further include a transmission loss detector and a gain controller. The signal generator of the second repeater 204 can generate RF reference signals at a predetermined amplitude or power for transmission across the structural element 206 to the first repeater 202. The transmission loss detector of the first repeater 202 determines a transmission loss across the structural element 206 based on the amplitude or power of the received RF reference signals. The gain controller of the first repeater 202 can adjust a gain or noise power of the amplifier of one or both of the repeaters 202, 204 to compensate for the determined transmission loss across the structural element 206. The RF reference signals can advantageously be used to calibrate one or both of the amplifiers, while the repeaters can continuously amplify the RF communication signals.

In another aspect, the second repeater 204 can further include a signal detector. The first repeater 202 can further include a transmission loss detector and a gain controller. The signal detector of the second repeater 204 can determine the amplitude or power of the RF communication signals as received at the second repeater 204. The transmission loss detector of the first repeater 202 can determine the transmission loss across the structural element 206 based upon the amplitude or power of the RF communication signals as received at the second repeater 204 and the first repeater 202. The gain controller of the first repeater 202 can adjust the gain or noise power of one or both of the repeaters 202, 204 to compensate for the determined transmission loss across the structural element 206. The RF communication signals can again be used advantageously to calibrate one or both of the amplifiers, while the repeaters can continuously amplify the RF communication signals.

In one aspect, the wireless power transmitter 210 and the power coupler 212 of the first repeater 202 make up a first wireless power unit, and the wireless power receiver 224 and the power coupler 226 of the second repeater 202 make up a second wireless power unit. The wireless power transmitter 210 of the first repeater 202 can be coupled to the power coupler 212. In one aspect, the wireless power receiver 224 of the second repeater 204 can be coupled to the power coupler 226. In one aspect, the power couplers 212, 226 of the first and second repeaters 202, 204 can be inductive coils for non-radiative techniques using magnetic fields. In another aspect, the power couplers 212, 226 of the first and second repeaters 202, 204 can be capacitive electrodes for radiative techniques using electric fields.

In one aspect, the wireless power transmitter 210 can convert a portion of Direct Current (DC) or Alternating Current (AC) electrical power received from a power source of the first repeater 202 to wireless power. The term wireless power is used herein as a generic term that refers to a number of different power transmission technologies that use time-varying electric, magnetic, or electromagnetic fields, or photon energy. In one aspect, the DC or AC power can be converted to a RF power signal. The RF power signal can be transmitted from the power coupler 212 of the first repeater 202 through the structural element 206 and received by the power coupler 226 of the second repeater 204. A first shielding path can be between the power coupler 212 of the first repeater 202 and the structural element 206. A second shielding path can be between the power coupler 226 of the second repeater 204 and the structural element 206. The first or second shielding path can substantially limit electromagnetic waves passing through the one or more openings in the conductive film to the electromagnetic signal or photon energy associated with the wireless power transfer. The use of the openings in the conductive films, combined with the shielding paths, enables an increased efficiency in passing the wireless power between the first and second repeaters, while maintaining an increased isolation between the transmission antennas of the first and second repeaters due to the conductive film. In one example, the shielding path can be comprised of a material that substantially blocks electromagnetic waves. For example, an opaque metallic tape can be used to form the first shielding path or the second shielding path. The first or second shielding path can be shaped based on the beam shape formed by the power coupler 212 of the first repeater 202 or the power coupler 226 of the second repeater 204. The wireless power receiver 224 can convert the RF power signal received by the power coupler 226 into DC or AC electrical power. The DC or AC electrical power from the wireless power receiver 224 can power the second repeater 204. In one instance, the wireless power transmitter 210 can transmit power to the wireless power receiver 224 to enable generation of approximately 500 mA of steady state current, 1000 mA of peak current draw, and approximately 5-7.5 W of total power for use by the circuits of the second repeater 204.

As discussed above, the bi-directional amplifier 228 of the second repeater 204 can be configured to control the uplink and downlink power supplied by the bi-directional amplifier 228 independently. In one aspect, the power supplied by the bi-directional amplifier 228 can be configured to provide respective power levels for the uplink and downlink signal transmission within applicable limits that may be set by one or more regulatory entities. In other aspects, it is to be appreciated that the uplink transmission power level typically is greater than the downlink transmission power level. In addition, the size of the wireless power transmitter 210, wireless power receiver 224 and power couplers 212, 226 tend to increase as the amount of power needed by the second repeater 204 increases. Therefore, the bi-directional amplifier 228 of the second repeater 204 can be operated in a passive mode, whereby the bi-directional amplifier 228 supplies little or no additional power during transmission of uplink signals.

In one aspect, the wireless power transfer between the first and second repeaters 202, 204 provided by the powerless power transmitter 210, wireless power receiver 224 and power couplers 212, 226 enable easy installation of the second repeater 204 on the outside of the structure. Installation can be simplified because one or more cables coupling the first and second repeaters 202, 204 are not used, and therefore do not need to be routed through or around structural elements such as walls, windows, or doors. Eliminating the need to route cables coupling the first and second repeaters 202, 204, provided by the present technology, may be particularly advantageous for consumers doing their own installation, and/or deployment in structures that may be rented or leased such as apartments or leased cars. The outside second repeater 204 of the present technology also advantageously sets the noise figure and increases performance as compared to a single inside repeater or locating both the first and second repeaters inside a structure.

In one aspect, the one or more conductive films 208 can be transparent films or substantially transparent films. A conductive film 208 can be substantially transparent when it has a visible light transmittance of 70% or more. In one instance, the transparent conductive films may be a film of thin metal wires or other types of metallic coating that can be used to reflect desired wavelengths. Window coatings and films typically are designed to reflect ultraviolet (UV) wavelengths and infrared (IR) wavelengths. However, the same coatings and films can also substantially attenuate radio frequency signals. The visibility of the one or more conductive films 208 can be relatively low such that individuals can readily see through the conductive films 208. In one instance, a conductive film 208 disposed between the first and second repeaters 202, 204 can be placed on one side or the other of the structural element 206. In another instance, conductive films disposed between the first and second repeaters 202, 204 can be placed on both side of the structural element 206. In one aspect, the one or more conductive films 208 include openings that can be disposed between the power couplers 212, 226, and between the RF coupling antennas 216, 230 to permit RF communications signal and power transmission signals to readily couple between the first and second repeaters 202, 204. The conductive film 208 can, however, block other conductive paths of the RF signals between the first and second repeater 202, 204 thereby reducing feedback. The conductive film 208 therefore can be utilized to increase antenna-to-antenna isolation between the transmission antennas 218, 232, between the coupling antenna 216 of the first repeater and the transmission antenna 232 of the second repeater, and/or between the coupling antenna 230 of the second repeater 204 and the transmission antenna 218 of the first repeater 202. In another aspect, the one or more conductive films 208 may not include openings to increase antenna-to-antenna isolation between the transmission antennas 218, 232, between the coupling antenna 216 of the first repeater and the transmission antenna 232 of the second repeater, and/or between the coupling antenna 230 of the second repeater 204 and the transmission antenna 218 of the first repeater 202. A first shielding path can be between the coupling antenna 216 of the first repeater and the structural element 206. A second shielding path can be between the coupling antenna 230 of the second repeater 204 and the structural element 206. The first or second shielding path can substantially limit electromagnetic waves passing through the one or more openings in the conductive film to the electromagnetic signal or photonic energy associated with the coupling antennas of the first and second repeater. The use of the openings in the conductive films, combined with the shielding paths, enables an increased efficiency in passing the wireless signal between the coupling antennas of the first and second repeaters, while maintaining an increased isolation between the transmission antennas of the first and second repeaters due to the conductive film. In one example, the shielding path can be comprised of a material that substantially blocks electromagnetic waves. For example, metallic tape can be used to form the first shielding path or the second shielding path. The first or second shielding path can be shaped based on the beam shape formed by the coupling antenna 216 of the first repeater 202 or the coupling antenna 230 of the second repeater 204.

In one aspect, the first repeater 202 and/or the second repeater 204 can be affixed to the structural element 206 by an adhesive such as glue or tape. In another aspect, the first repeater 202 and/or the second repeater 204 can be affixed to the structural element 206 by a magnet, if the structural element 206 is non-metallic. The magnets may also be utilized to align the power couplers 212, 226 of the first and second repeaters 202, 204. In yet other aspects, other fastening means or combinations thereof can be used to affix the first and second repeater 202, 204 to the structural element, such as nails, screws, adhesive backed hook and loop fasteners, or the like.

FIGS. 3A, 3B and 3C depict a wireless system, in accordance with another example. In one aspect, the wireless system includes a first repeater 302 and a second repeater 304. The first and second repeaters 302, 304 are adapted for disposition opposite each other about a structural element 306, such as a window, non-metallic car body panel or similar element. In one instance, the first repeater 302 can be an inside repeater adapted for placement within a vehicle 306 or similar structure, and the second repeater 304 can be an outside repeater adapted for placement outside the vehicle 306. In one aspect, the various functions of the repeaters 302, 304, can be implemented in hardware, firmware, software stored in memory and executed by one or more processing units, and/or any combination thereof.

In one aspect, the first repeater 302 can include a wireless power transmitter (WPT) 310, a power coupler 312, one or more bi-directional amplifiers (BDA) 314, one or more RF coupling antennas 316, and one or more optional transmission antennas 318. In one aspect, the second repeater 304 can include a wireless power receiver (WPR) 324, a power coupler 326, one or more bi-directional amplifiers (BDA) 328, one or more RF coupling antennas 330, and one or more optional transmission antennas 332. The wireless system may optionally include one or more conductive films 308 for disposition between the first and second repeaters 302, 304.

In one aspect, the one or more bi-directional amplifiers 314 of the first repeater 302 can be configured to amplify one or more RF communication signals. In one aspect, the one or more bi-directional amplifiers 328 of the second repeater 304 can be configured to amplify the one or more RF communication signals. In one instance, the one or more bi-directional amplifiers 314, 328 can be configured to amplify both uplink and downlink 3GPP LTE signals.

In one aspect, the transmission antenna 332 of the second repeater 304 can be an omni-directional antenna. An omni-directional antenna may advantageously be utilized with vehicles that move about with respect base stations of the service provider. In one aspect, the transmission antenna 332 of the second repeater 304 can be directly or indirectly coupled to the second repeater 304. In one instance, the transmission antenna 332 of the second repeater may be located adjacent to or on a metallic body panel of the vehicle to increase antenna-to-antenna isolation between the transmission antennas 318, 332. In one aspect, the transmission antenna 318 of the first repeater 302 can be a directional antenna to reduce feedback between the transmission antennas 318, 332, between the transmission antenna 318 and the RF coupling antenna 330, or between the transmission antenna 318 and the RF coupling antenna 316.

In one aspect, the one or more bi-directional amplifiers 314 of the first repeater 302 can include one or more RF transmission ports 320 and one or more RF coupling ports 322. The one or more transmission antennas 318 can be coupled to the respective one or more RF transmission ports 320, and the one or more RF coupling antennas 316 can be coupled to the respective one or more RF coupling ports 322 of the first repeater 302. In one aspect, the one or more bi-directional amplifiers 328 of the second repeater 304 can include one or more RF transmission ports 334 and one or more RF coupling ports 336. The one or more transmission antennas 332 can be coupled to the respective one or more RF transmission ports 334, and the one or more RF coupling antennas 330 can be coupled to the respective one or more RF coupling ports 336 of the second repeater 304.

In one aspect, the bi-directional amplifier 328 of the second repeater can boost one or more RF communication signal received from and transmitted to a base station. The bi-directional amplifier 328 can improve the gain and/or noise-power on uplink and/or downlink communication RF signals, at the RF transmission port 334 of the bi-directional amplifier 328, to increase the range and/or increase the signal strength of RF communication signal between the second repeater 304 and base stations of a service provider. On the downlink path the second repeater 304 can preserve the signal-to-noise ratio and can set the noise figure for the system at a much lower level than otherwise. On the uplink, the second repeater 304 enables a much stronger signal to be transmitted and therefore reach the BS in more cases. In some instances, the gain or noise power as measured at the RF transmission port 334 or transmission antenna 332 of the second repeater 304 can be constrained by a government agency, an industry standard, or similar regulatory entity. Accordingly, the bi-directional amplifier 328 of the second repeater 304 can be configured to provide a gain or noise power level as measured at the RF transmission port 334 or transmission antenna 332 of the second repeater 304 to comply with such constrains. In one aspect, the bi-directional amplifier 328 can be configured to control the uplink and downlink power supplied by the bi-directional amplifier 328 independently.

In one aspect, the structural element 306, such as a windshield or similar element can appreciable reduce the signal strength of RF signals entering the vehicle. Therefore, in one aspect, the bi-directional amplifier 314 of the first repeater 302 and/or the bi-directional amplifier 328 of the second repeater 304 can boost the one or more RF communication signals transmitted through the windshield or similar structural element. The bi-directional amplifier 314 of the first repeater 302 and/or the bi-directional amplifier 328 of the second repeater can improve the gain and/or noise power on uplink and/or downlink communication RF signals, at the RF coupling port 322 of the bi-directional amplifier 314 and/or at the RF coupling port 336 of the bi-directional amplifier 328, to compensate for the loss through the structural element 306. The gain or noise power of at the RF coupling port 322 of the bi-directional amplifier 314 and/or at the RF coupling port 336 of the bi-directional amplifier 328 can be selected such that the losses introduced by the structural element 306 reduces feedback through the one or more transmission antennas 318 of the first repeater 302 and/or the one or more transmission antenna 332 of the second repeater 304.

In one aspect, the bi-directional amplifier 314 of the first repeater 302 can transmit, with little or no boost, the RF communication signals to one or more UEs within the vehicle 306. Optionally, the bi-directional amplifier 314 of the first repeater 302 can boost the one or more RF communication signals for transmission to the one or more UEs. The bi-directional amplifier 314 can improve the gain and/or noise power on uplink and/or downlink communication RF signals, at the RF transmission port 320 of the bi-directional amplifier 314, to increase the range and/or increase the signal strength of RF communication signal between the first repeater 302 and one or more UEs within the structure. In some instances, the gain or noise power as measured at the RF transmission port 320 or transmission antenna 218 of the first repeater 302 can be constrained by a government agency, an industry standard, or similar regulatory entity. Accordingly, the bi-directional amplifier 314 of the first repeater 302 can be configured to provide a gain or noise power level as measured at the RF transmission port 320 or transmission antenna 318 of the first repeater 302 to comply with such constrains. In one aspect, the bi-directional amplifier 314 can be configured to control the uplink and downlink power supplied by the bi-directional amplifier 314 independently.

In one instance, the bi-directional amplifier 228 of the first and second repeaters 302, 304 can provide approximately 30-40 dB of gain. In addition, the transmission antenna 318 of the first repeater 302 can be an internal integral directional antenna, while the transmission antenna 332 of the second repeater 304 can be an external integral omnidirectional antenna.

In one aspect, the amount of gain provided by the first repeater 302 and/or the second repeater 304 can be based upon the transmission loss across the structural element 306. In one aspect, the first and second repeater 302, 304 can use RF reference signals or RF communication signals to determine the transmission loss across the structural element 306 coupling the repeaters. In one aspect, the second repeater 304 can further include a signal generator. The first repeater 302 can further include a transmission loss detector and a gain controller. The signal generator of the second repeater 304 can generate RF reference signals at a predetermined amplitude or power for transmission across the structural element 306 to the first repeater 302. The transmission loss detector of the first repeater 302 determines a transmission loss across the structural element 306 based on the amplitude or power of the received RF reference signals. The gain controller of the first repeater 302 can adjust a gain or noise power of the amplifier of one or both of the repeaters 302, 304 to compensate for the determined transmission loss across the structural element 306. The RF reference signals can advantageously be used to calibrate one or both of the amplifiers, while the repeaters can continuously amplify the RF communication signals.

In another aspect, the second repeater 304 can further include a signal detector. The first repeater 302 can further include a transmission loss detector and a gain controller. The signal detector of the second repeater 304 can determine the amplitude or power of the RF communication signals as received at the second repeater 304. The transmission loss detector of the first repeater 302 can determine the transmission loss across the structural element 306 based upon the amplitude or power of the RF communication signals as received at the second repeater 304 and the first repeater 302. The gain controller of the first repeater 302 can adjust the gain or noise power of one or both of the repeaters 302, 304 to compensate for the determined transmission loss across the structural element 306. The RF communication signals can again be used advantageously to calibrate one or both of the amplifiers, while the repeaters can continuously amplify the RF communication signals.

In one aspect, the wireless power transmitter 310 and the power coupler 312 of the first repeater 302 make up a first wireless power unit, and the wireless power receiver 324 and the power coupler 326 of the second repeater 302 make up a second wireless power unit. The wireless power transmitter 310 of the first repeater 302 can be coupled to the power coupler 312. In one aspect, the wireless power receiver 324 of the second repeater 304 can be coupled to the power coupler 326. In one aspect, the power couplers 312, 326 of the first and second repeaters 302, 304 can be inductive coils for non-radiative techniques using magnetic fields. In another aspect, the power couplers 312, 326 of the first and second repeaters 302, 304 can be capacitive electrodes for radiative techniques using electric fields.

In one aspect, the wireless power transmitter 310 can convert a portion of DC or AC power received from a power source of the first repeater 302 to a RF power signal. The RF power signal can be transmitted from the power coupler 312 of the first repeater 302 through the structural element of the vehicle 306, such as the windshield, and received by the power coupler 326 of the second repeater 304. The wireless power receiver 324 can convert the RF power signal received by the power coupler 326 into a DC or AC power. The DC or AC power from the wireless power receiver 324 can power the second repeater 304.

As discussed above, the bi-directional amplifier 328 of the second repeater 304 can be configured to control the uplink and downlink power supplied by the bi-directional amplifier 328 independently. In one aspect, the power supplied by the bi-directional amplifier 328 can be configured to provide respective power levels for the uplink and downlink signal transmission within applicable limits that may be set by one or more regulatory entities. In other aspects, it is to be appreciated that the uplink transmission power level typically is greater than the downlink transmission power level. In addition, the size of the wireless power transmitter 310, wireless power receiver 324 and power couplers 312, 326 tend to increase as the amount of power needed by the second repeater 304 increases. Therefore, the bi-directional amplifier 328 of the second repeater 304 can be operated in a passive mode, whereby the bi-directional amplifier 328 supplies little or no additional power during transmission of uplink signals.

In one aspect, the wireless power transfer between the first and second repeaters 302, 304 provided by the wireless power transmitter 310, wireless power receiver 324 and power couplers 312, 326 enable easy installation of the second repeater 304 on the outside of the structure. Installation can be simplified because one or more cables coupling the first and second repeaters 302, 304 are not used, and therefore do not need to be routed through or around structural elements such as windows, doors or body panels. Eliminating the need to route cables coupling the first and second repeaters 302, 304, provided by the present technology, may be particularly advantageous for consumers doing their own installation, and/or deployment in structures that may be rented or leased such as apartments or leased cars. The outside second repeater 304 of the present technology also advantageously sets the noise figure and increases performance as compared to a single inside repeater or locating both the first and second repeaters inside a structure.

In one aspect, the one or more conductive films 308 can be transparent films or substantially transparent films. A conductive film 308 can be substantially transparent when it has a visible light transmittance of 70% or more. In one instance, the transparent conductive films may be a film of thin metal wires. The visibility of the one or more conductive films 308 can be relatively low such that individuals can readily see through the conductive film 308. In one instance, a conductive film 308, disposed between the first and second repeaters 302, 304, can be placed on one side or the other of the windshield of the vehicle 306. In another instance, conductive films, disposed between the first and second repeaters 302, 304, can be placed on both side of the windshield of the vehicle 306. In one aspect, the conductive film 308 includes openings that can be disposed between the power coupler 312, 326, and between the RF coupling antennas 316, 330 to permit RF communications signal and power transmission signals to readily couple between the bi-directional amplifiers 314, 328 of the first and second repeaters 302, 304. The conductive film 308 can, however, block other conductive paths of the RF signals between the first and second repeaters 302, 304 thereby reducing feedback. The conductive film 308 therefore can be utilized to increase antenna-to-antenna isolation between the transmission antennas 318, 332, between the coupling antenna 316 of the first repeater and the transmission antenna 332 of the second repeater, and/or between the coupling antenna 330 of the second repeater 304 and the transmission antenna 318 of the first repeater 302. In another aspect, the one or more conductive films 308 may not include openings to increase antenna-to-antenna isolation between the transmission antennas 318, 332, between the coupling antenna 316 of the first repeater and the transmission antenna 332 of the second repeater, and/or between the coupling antenna 330 of the second repeater 304 and the transmission antenna 318 of the first repeater 302.

In one aspect, the first repeater 302 and/or the second repeater 304 can be affixed to the structural element 306 by an adhesive such as glue or tape. In another aspect, the first repeater 302 and/or the second repeater 304 can be affixed to the structural element 306 by a magnet. If the structural element 306 is non-metallic, the magnets may also be utilized to align the power couplers 312, 326 of the first and second repeaters 302, 304. In yet other aspects, other fastening means or combinations thereof can be used to affix the first and second repeater 302, 304 to the structural element, such as nails, screws, adhesive backed hook and loop fasteners, or the like.

FIGS. 4A and 4B depict a wireless system, in accordance with another example. In one aspect, the wireless system includes a first repeater 402 and a second repeater 404. In one aspect, the first repeater 402 can include an optical power transmitter (OPT) 406, one or more bi-directional amplifiers (BDA) 408, one or more RF coupling antennas 410, and one or more optional transmission antennas 412. In one aspect, the second repeater 404 can include an optical power receiver (OPR) 414, one or more bi-directional amplifiers (BDA) 416, one or more RF coupling antennas 418, and one or more optional transmission antennas 420. The wireless system may optionally include one or more conductive films 422 for disposition on a structural element 424 between the first and second repeaters 402, 404. The one or more bi-directional amplifiers 408, one or more RF coupling antennas 410 and one or more transmission antennas 412 of the first repeater 402, and the one or more bi-directional amplifiers 416, one or more RF coupling antennas 418 and one or more transmission antennas 420 of the second repeater 404 can function as described above with regard to FIG. 2.

In one aspect, the optical power transmitter 406 can convert a portion of DC or AC power received from a power source of the first repeater 402 to optical energy. The optical energy can be transmitted from optical power transmitter 406 of the first repeater 402 through a transparent or substantially transparent structural element 424, such as a window, and received by the optical power receiver 414 of the second repeater 404. A structural element 424 can be substantially transparent when it has a visible light transmittance of 70% or more. The wireless power receiver 414 can convert the received optical energy into DC or AC power. The DC or AC power from the optical power receiver 414 can power the bi-directional amplifier 416 or any other circuits, as necessary, of the second repeater 404. In one instance, the optical power transmitter 406 can transmit power to the optical power receiver 414 to enable generation of approximately 500 mA of steady state current, 1000 mA of peak current draw, and approximately 5-7.5 W of total power for use by the circuits of the second repeater 404.

In one instance, the optical power transmitter 406 may transmit the power as laser light to the optical power receiver 414. The laser light may be defocused in the optical power transmitter 406 to prevent the laser light from damaging the structural element 424 or harming individuals. Alternatively or in addition, the optical power transmitter 406 may initially transmit a relatively low power level of laser light. The relatively low power laser light received at the optical power receiver 414 can be measured to determine, as a safety mechanism, if the optical power transmitter 406 and the optical power receiver 414 are aligned. If the optical power transmitter 406 and optical power receiver 414 are determined to be aligned, the output power level of the laser light may be increase to a higher power level to power the second repeater 404.

Figure 5C:
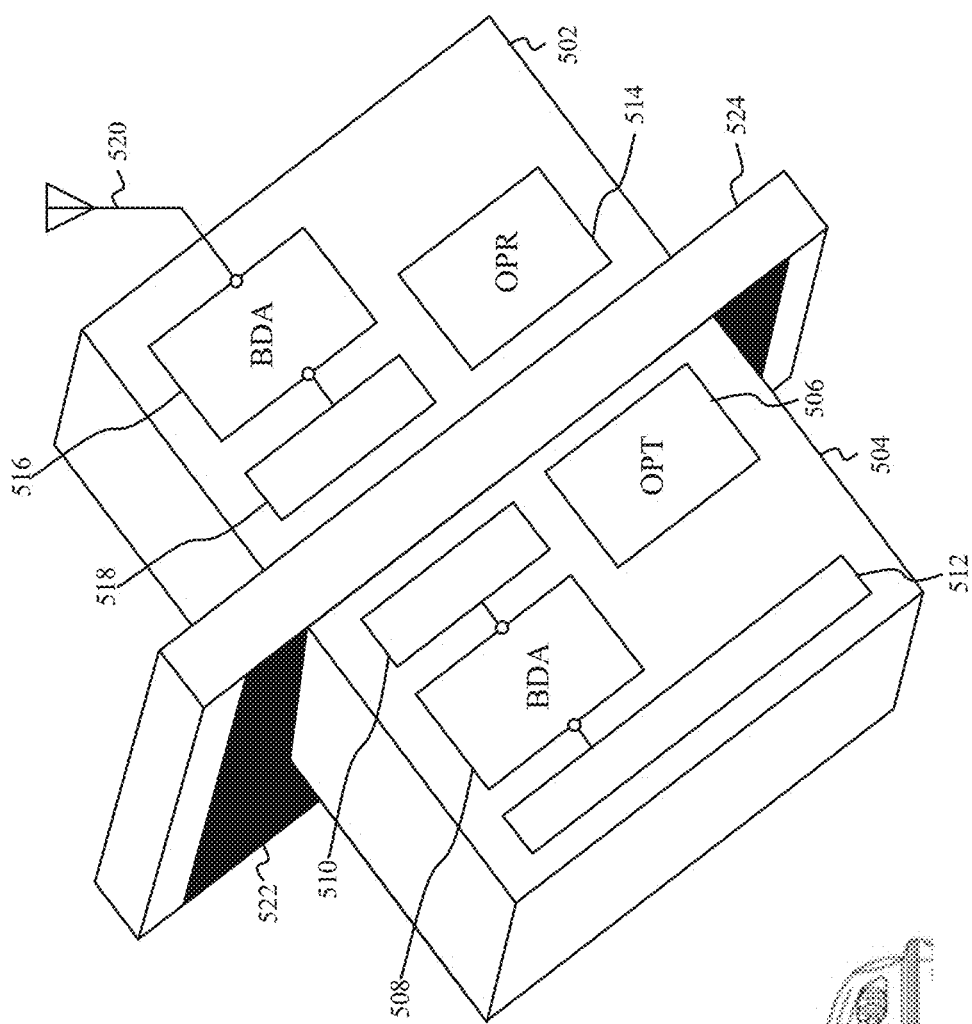
FIGS. 5A-5C depict a wireless system, in accordance with yet another example.
Figure 5A:
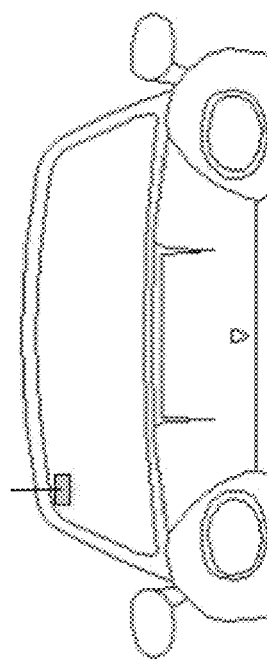
Figure 5B:
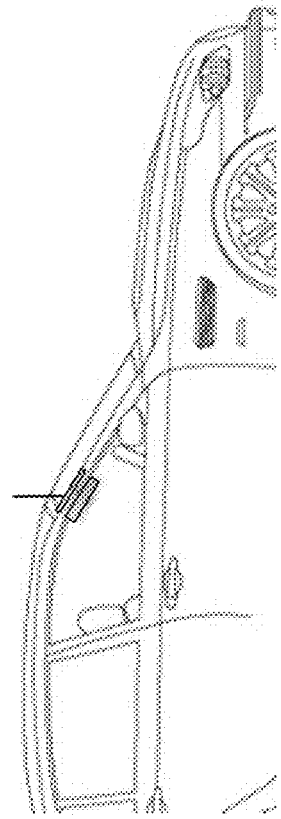

FIGS. 5A, 5B and 5C depict a wireless system, in accordance with another example. In one aspect, the wireless system includes a first repeater 502 and a second repeater 504. In one aspect, the first repeater 502 can include an optical power transmitter 506, one or more bi-directional amplifiers 508, one or more RF coupling antennas 510, and one or more optional transmission antennas 512. In one aspect, the second repeater 504 can include an optical power receiver 514, one or more bi-directional amplifiers 516, one or more RF coupling antennas 518, and one or more optional transmission antennas 520. The wireless system may optionally include one or more conductive films 522 for disposition on a structural element 524 between the first and second repeaters 502, 504. The one or more bi-directional amplifiers 508, one or more RF coupling antennas 510 and one or more transmission antennas 512 of the first repeater 502, and the one or more bi-directional amplifiers 516, one or more RF coupling antennas 518 and one or more transmission antennas 520 of the second repeater 504 can function as described above with regard to FIG. 3.

In one aspect, the optical power transmitter 506 can convert a portion of power received from a power source of the first repeater 502 to optical energy. The optical energy can be transmitted from optical power transmitter 506 of the first repeater 502 through a transparent or substantially transparent structural element 524, such as a windshield, and received by the optical power receiver 514 of the second repeater 504. A structural element 524 can be substantially transparent when it has a visible light transmittance of 70% or more. The optical power receiver 514 can convert the received optical energy into a direct current (DC) power. The DC power from the optical power receiver 514 can power the second repeater 504. In one instance, the optical power transmitter 506 can transmit power to the optical power receiver 514 to enable generation of approximately 500 mA of steady state current, 1000 mA of peak current draw, and approximately 5-7.5 W of total power for use by the circuits of the second repeater 504.

In one instance, the optical power transmitter 506 may transmit the power as laser light to the optical power receiver 514. The laser light may be defocused in the optical power transmitter 506 to prevent the laser light from damaging the structural element 524 or harming individuals. Alternatively or in addition, the optical power transmitter 506 may initially transmit a relatively low power level of laser light. The relatively low power laser light received at the optical power receiver 514 can be measured to determine, as a safety mechanism, if the optical power transmitter 506 and the optical power receiver 514 are aligned. If the optical power transmitter 506 and optical power receiver 514 are determined to be aligned, the output power level of the laser light may be increase to a higher power level to power the second repeater.

Figure 6:
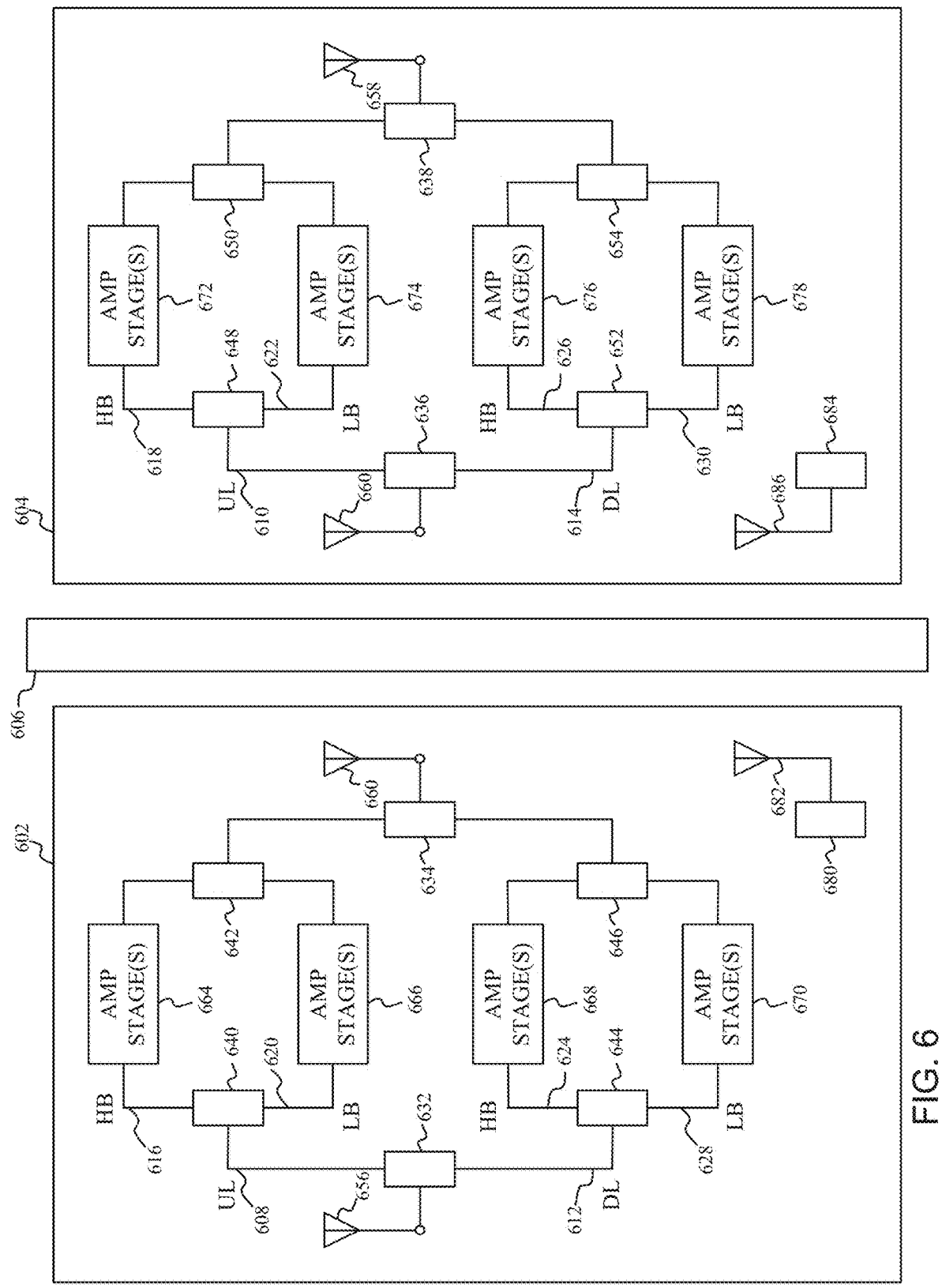
FIG. 6 depicts a wireless system, in accordance with yet another example.

FIG. 6 depicts a wireless system, in accordance with another example. In one aspect, the wireless system includes a first repeater 602 and a second repeater 604. The first and second repeaters 602, 604 are adapted for disposition opposite each other about a structural element 606, such as a wall, window, windshield or similar element.

In one aspect, the first and second repeaters 602, 604 can include one or more RF channels. The RF channels can include one or more uplink (UL) channels 608, 610 and one or more downlink (DL) channels 612, 614. In one instance, the uplink (UL) channels 608, 611 can include one or more high band (HB) channels 616, 618 and one or more low band (LB) channels 620, 624. Similarly, the downlink (DL) channels 612, 614 can include one or more high band (HB) channels 624, 626 and one or more low band (LB) channels 628, 630.

In one aspect, the first and second repeater 602, 604 can include one or more splitters 632-638 and one or more diplexers 640-654, or similar circuits, to separate and recombine the RF communication signals received on respective one or more transmission antennas 656, 658 and one or more coupling antennas 660, 662. In another aspect, the splitter and diplexers, as illustrated in FIG. 6, can be switched to allow for narrow-band splitters. In another aspect, the splitters, as illustrated in FIG. 6, can be replaced with circulators or separate antennas. Each channel of the first and second repeater 602, 604 can include one or more amplifier stages 664-678. In one aspect, the one or more amplifier stages 664-678 can be configured to amplify respective uplink and downlink 3GPP LTE signals. In one aspect, internal oscillations can be less likely due to the separate coupling paths of the uplink and downlink channels.

In one aspect, the first repeater 602 also includes a wireless power transmitter 680 and a power coupler 682. The second repeater 604 also includes a wireless power receiver 684 and a power coupler 686. In one aspect, the power couplers 682, 686 of the first and second repeaters 602, 604 can be inductive coils for non-radiative techniques using magnetic fields. In another aspect, the power couplers 682, 686 of the first and second repeaters 602, 604 can be capacitive electrodes for radiative techniques using electric fields.

In one aspect, the wireless power transmitter 680 can convert a portion of DC or AC power received from a power source of the first repeater 602 to a RF power signal. The RF power signal can be transmitted from the power coupler 682 of the first repeater 602 through the structural element 606 and received by the power coupler 686 of the second repeater 604. The wireless power receiver 684 can convert the RF power signal received by the power coupler 686 into DC or AC power. The DC or AC power from the wireless power receiver 684 can power the circuitry of the second repeater 604. In one instance, the wireless power transmitter 680 can transmit power to the wireless power receiver 684 to enable generation of approximately 500 mA of steady state current, 1000 mA of peak current draw, and approximately 5-7.5 W of total power for use by the circuits of the second repeater 604.

In one aspect, the Single-Input-Single-Output (SISO) architecture of the first and second repeater 602, 604 may be characterized by lower current draw, as compared to conventional repeater architectures. The reduced current draw in the second repeater 604 may advantageously enable a reduction of the amount of power needed to be transferred between the wireless power transmitter 680 and wireless power receiver 684, and also enable a reduction in the size of the power couplers 682, 686.

In another aspect, the first repeater 602 can include an optical power transmitter and the second repeater 604 can include an optical power receiver. In one aspect, the optical power transmitter can convert a portion of power received from a power source of the first repeater 602 to optical energy. The optical energy can be transmitted from optical power transmitter of the first repeater 602 through a transparent or substantially transparent structural element 606, such as a window, and received by the optical power receiver of the second repeater 604. A structural element 606 can be substantially transparent when it has a visible light transmittance of 70% or more. The optical power receiver can convert the received optical energy into DC or AC power. The DC or AC power from the optical power receiver can power the circuitry of the second repeater 604. In one instance, the optical power transmitter can transmit power to the optical power receiver to enable generation of approximately 500 mA of steady state current, 1000 mA of peak current draw, and approximately 5-7.5 W of total power for use by the circuits of the second repeater 604.

In one aspect, the wireless system may optionally include one or more conductive films for disposition between the first and second repeaters 602, 604. In one aspect, the one or more conductive films can be transparent or substantially transparent films. A conductive film can be substantially transparent when it has a visible light transmittance of 70% or more. In one instance, the transparent conductive films may be a film of thin metal wires. The visibility of the one or more conductive films can be relatively low such that individuals can readily see through the conductive films. In one instance, a conductive film disposed between the first and second repeaters 602, 604 can be placed on one side or the other of the structural element 606. In another instance, conductive films disposed between the first and second repeaters 602, 604 can be placed on both side of the structural element 606. In one aspect, the one or more conductive films include openings that can be disposed between the power couplers 682, 686, and between the RF coupling antennas 660, 662 to permit RF communications signal and power transmission signals to readily couple between the first and second repeaters 602, 604. The conductive film can, however, block other conductive paths of the RF signals between the first and second repeater 602, 604 thereby reducing feedback. The conductive film therefore can be utilized to increase antenna-to-antenna isolation between the transmission antennas 656, 658, between the coupling antenna 660 of the first repeater 602 and the transmission antenna 658 of the second repeater 604, and/or between the coupling antenna 662 of the second repeater 604 and the transmission antenna 656 of the first repeater 602. In another aspect, the one or more conductive films may not include openings to increase antenna-to-antenna isolation between the transmission antennas 656, 658, between the coupling antenna 660 of the first repeater 602 and the transmission antenna 658 of the second repeater 604, and/or between the coupling antenna 662 of the second repeater 604 and the transmission antenna 656 of the first repeater 602.

Figure 7:
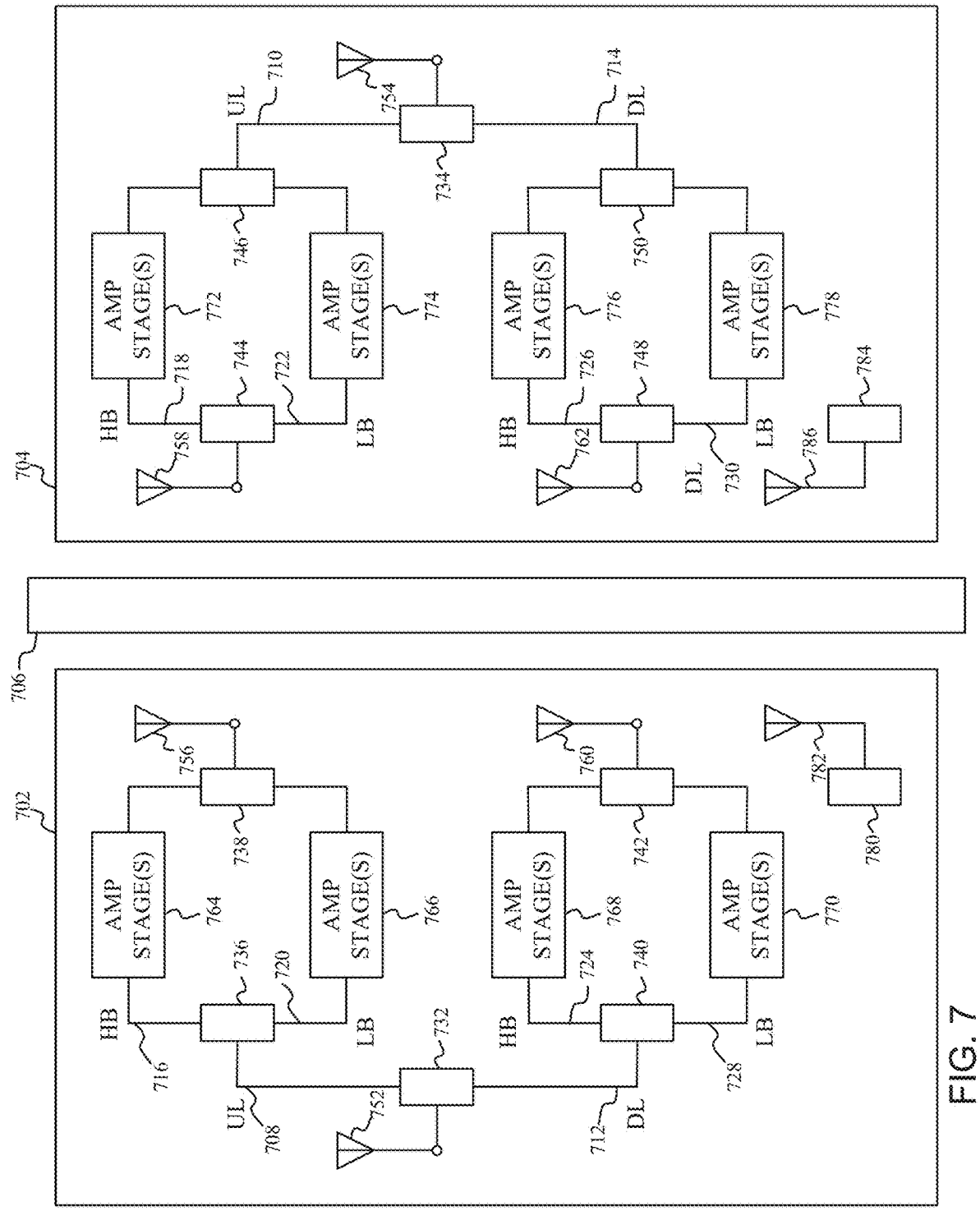
FIG. 7 depicts a wireless system, in accordance with yet another example.

FIG. 7 depicts a wireless system, in accordance with another example. In one aspect, the wireless system includes a first repeater 702 and a second repeater 704. The first and second repeaters 702, 704 are adapted for disposition opposite each other about a structural element 706, such as a wall, a window, a windshield or similar element.

In one aspect, the first and second repeaters 702, 704 can include one or more RF channels. The RF channels can include one or more uplink (UL) channels 708, 710 and one or more downlink (DL) channels 712, 714. In one instance, the uplink (UL) channels 708, 710 can include one or more high band (HB) channels 716, 718 and one or more low band (LB) channels 720, 722. Similarly, the downlink (DL) channels 712, 714 can include one or more high band (HB) channels 724, 726 and one or more low band (LB) channels 728, 730.

In one aspect, the first and second repeater 702, 704 can include one or more splitters 732, 734 and one or more diplexers 736-750, or similar circuits, to separate and recombine the RF communication signals received on respective one or more transmission antennas 752, 754 and one or more coupling antennas 756-762. In another aspect, the splitter and diplexers, as illustrated in FIG. 7, can be switched to allow for narrow-band splitters. In another aspect, the splitters, as illustrated in FIG. 7, can be replaced with circulators or separate antennas. Each channel of the first and second repeater 702, 704 can include one or more amplifier stages 764-778. In one aspect, the one or more amplifier stages 764-778 can be configured to amplify respective uplink and downlink 3GPP LTE signals. In one aspect, internal oscillations can be less likely due to the separate coupling paths of the uplink and downlink channels.

In one aspect, the first repeater 702 also includes a wireless power transmitter 780 and a power coupler 782. The second repeater 704 also includes a wireless power receiver 784 and a power coupler 786. In one aspect, the power couplers 782, 786 of the first and second repeaters 702, 704 can be inductive coils for non-radiative techniques using magnetic fields. In another aspect, the power couplers 782, 786 of the first and second repeaters 702, 704 can be capacitive electrodes for radiative techniques using electric fields.

In one aspect, the wireless power transmitter 780 can convert a portion of DC or AC power received from a power source of the first repeater 702 to a RF power signal. The RF power signal can be transmitted from the power coupler 782 of the first repeater 702 through the structural element 706 and received by the power coupler 786 of the second repeater 704. The wireless power receiver 784 can convert the RF power signal received by the power coupler 786 into DC or AC power. The DC or AC power from the wireless power receiver 784 can power the circuitry of the second repeater 704. In one instance, the wireless power transmitter 780 can transmit power to the wireless power receiver 786 to enable generation of approximately 500 mA of steady state current, 1000 mA of peak current draw, and approximately 5-7.5 W of total power for use by the circuits of the second repeater 704.

In one aspect, the SISO architecture of the first and second repeater 702, 704 may be characterized by lower current draw, as compared to conventional repeater architectures. The reduced current draw in the second repeater 704 may advantageously enable a reduction of the amount of power needed to be transferred between the wireless power transmitter 780 and wireless power receiver 784, and also enable a reduction in the size of the power couplers 782, 786.

In another aspect, the first repeater 702 can include an optical power transmitter and the second repeater 704 can include an optical power receiver. In one aspect, the optical power transmitter can convert a portion of power received from a power source of the first repeater 702 to optical energy. The optical energy can be transmitted from optical power transmitter of the first repeater 702 through a transparent or substantially transparent structural element 706, such as a window, and received by the optical power receiver of the second repeater 704. A structural element 706 can be substantially transparent when it has a visible light transmittance of 70% or more. The optical power receiver can convert the received optical energy into DC power. The DC power from the optical power receiver can power the circuitry of the second repeater 704. In one instance, the optical power transmitter can transmit power to the optical power receiver to enable generation of approximately 500 mA of steady state current, 1000 mA of peak current draw, and approximately 5-7.5 W of total power for use by the circuits of the second repeater 704.

In one aspect, the wireless system may optionally include one or more conductive films for disposition between the first and second repeaters 702, 704. In one aspect, the one or more conductive films can be transparent or substantially transparent films. A conductive film can be substantially transparent when it has a visible light transmittance of 70% or more. In one instance, the transparent conductive films may be a film of thin metal wires. The visibility of the one or more conductive films can be relatively low such that individuals can readily see through the conductive films. In one instance, a conductive film, disposed between the first and second repeaters 702, 704, can be placed on one side or the other of the structural element 706. In another instance, conductive films, disposed between the first and second repeaters 702, 704, can be placed on both side of the structural element 706. In one aspect, the one or more conductive films include openings that can be disposed between the power couplers 782, 786, and between the RF coupling antennas 756-762 to permit RF communications signal and power transmission signals to readily couple between the first and second repeaters 702, 704. The conductive film can, however, block other conductive paths of the RF signals between the first and second repeater 702, 704 thereby reducing feedback. The conductive film therefore can be utilized to increase antenna-to-antenna isolation between the transmission antennas 752, 754, between the coupling antennas 756, 760 of the first repeater 702 and the transmission antenna 754 of the second repeater 704, and/or between the coupling antennas 758, 762 of the second repeater 704 and the transmission antenna 752 of the first repeater 702. In another aspect, the one or more conductive films may not include openings to increase antenna-to-antenna isolation between the transmission antennas 752, 754, between the coupling antenna 756,760 of the first repeater 702 and the transmission antenna 754 of the second repeater 704, and/or between the coupling antenna 758, 762 of the second repeater 704 and the transmission antenna 752 of the first repeater 702.

Figure 8:
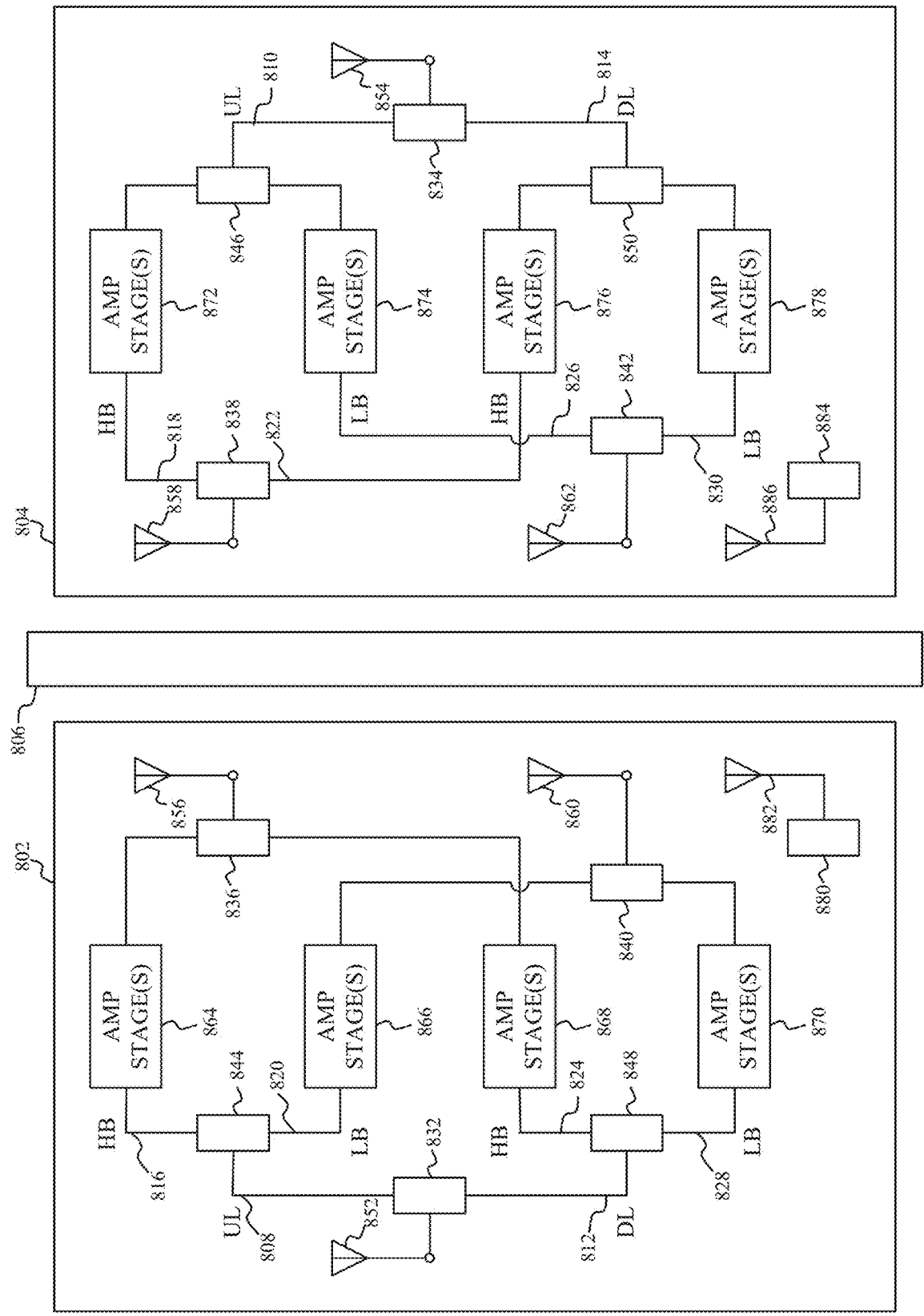
FIG. 8 depicts a wireless system, in accordance with yet another example.

FIG. 8 depicts a wireless system, in accordance with another example. In one aspect, the wireless system includes a first repeater 802 and a second repeater 804. The first and second repeaters 802, 804 are adapted for disposition opposite each other about a structural element 806, such as a wall, a window, a windshield or similar element.

In one aspect, the first and second repeaters 802, 804 can include one or more RF channels. The RF channels can include one or more uplink (UL) channels 808, 810 and one or more downlink (DL) channels 812, 814. In one instance, the uplink (UL) channels 808, 810 can include one or more high band (HB) channels 816, 818 and one or more low band (LB) channels 820, 822. Similarly, the downlink (DL) channels 812, 814 can include one or more high band (HB) channels 824, 826 and one or more low band (LB) channels 828, 830.

In one aspect, the first and second repeater 802, 804 can include one or more splitters 832-842 and one or more diplexers 844-850, or similar circuits, to separate and recombine the RF communication signals received on respective one or more transmission antennas 852, 854 and one or more coupling antennas 856-862. In another aspect, the splitter and diplexers, as illustrated in FIG. 8, can be switched to allow for narrow-band splitters. In another aspect, the splitters, as illustrated in FIG. 8, can be replaced with circulators or separate antennas. Each channel of the first and second repeater 802, 804 can include one or more amplifier stages 864-878. In one aspect, the one or more amplifier stages 864-878 can be configured to amplify respective uplink and downlink 3GPP LTE signals. In one aspect, internal oscillations can be less likely due to the separate coupling paths of the uplink and downlink channels.

In one aspect, the first repeater 802 also includes a wireless power transmitter 880 and a power coupler 882. The second repeater 804 also includes a wireless power receiver 884 and a power coupler 886. In one aspect, the power couplers 882, 886 of the first and second repeaters 802, 804 can be inductive coils for non-radiative techniques using magnetic fields. In another aspect, the power couplers 882, 886 of the first and second repeaters 802, 804 can be capacitive electrodes for radiative techniques using electric fields.

In one aspect, the wireless power transmitter 880 can convert a portion of DC or AC power received from a power source of the first repeater 002 to a RF power signal. The RF power signal can be transmitted from the power coupler 882 of the first repeater 802 through the structural element 806 and received by the power coupler 886 of the second repeater 804. The wireless power receiver 884 can convert the RF power signal received by the power coupler 886 into DC or AC power. The DC or AC power from the wireless power receiver 884 can power the circuitry of the second repeater 804. In one instance, the wireless power transmitter 880 can transmit power to the wireless power receiver 884 to enable generation of approximately 500 mA of steady state current, 1000 mA of peak current draw, and approximately 5-7.5 W of total power for use by the circuits of the second repeater 804.

In one aspect, the SISO architecture of the first and second repeater 802, 804 may be characterized by lower current draw, as compared to conventional repeater architectures. The reduced current draw in the second repeater 804 may advantageously enable a reduction of the amount of power needed to be transferred between the wireless power transmitter 880 and wireless power receiver 884, and also enable a reduction in the size of the power couplers 882, 886.

In another aspect, the first repeater 802 can include an optical power transmitter and the second repeater 804 can include an optical power receiver. In one aspect, the optical power transmitter can convert a portion of DC or AC power received from a power source of the first repeater 802 to optical energy. The optical energy can be transmitted from optical power transmitter of the first repeater 802 through a transparent or substantially transparent structural element 806, such as a window, and received by the optical power receiver of the second repeater 804. A structural element 806 can be substantially transparent when it has a visible light transmittance of 70% or more. The optical power receiver can convert the received optical energy into DC or AC power. The DC or AC power from the optical power receiver can power the circuitry of the second repeater 804. In one instance, the optical power transmitter can transmit power to the optical power receiver to enable generation of approximately 500 mA of steady state current, 1000 mA of peak current draw, and approximately 5-7.5 W of total power for use by the circuits of the second repeater 804.

In one aspect, the wireless system may optionally include one or more conductive films for disposition between the first and second repeaters 802, 804. In one aspect, the one or more conductive films can be transparent or substantially transparent films. A conductive film can be substantially transparent when it has a visible light transmittance of 70% or more. In one instance, the transparent conductive films may be a film of thin metal wires. The visibility of the one or more conductive films can be relatively low such that individuals can readily see through the conductive films. In one instance, a conductive film, disposed between the first and second repeaters 802, 804, can be placed on one side or the other of the structural element 806. In another instance, conductive films, disposed between the first and second repeaters 802, 804, can be placed on both side of the structural element 806. In one aspect, the one or more conductive films include openings that can be disposed between the power couplers 882, 886, and between the RF coupling antennas 856-862 to permit RF communications signal and power transmission signals to readily couple between the first and second repeaters 802, 784. The conductive film can, however, block other conductive paths of the RF signals between the first and second repeater 802, 804 thereby reducing feedback. The conductive film therefore can be utilized to increase antenna-to-antenna isolation between the transmission antennas 852, 854, between the coupling antennas 856, 860 of the first repeater 802 and the transmission antenna 854 of the second repeater 804, and/or between the coupling antennas 858, 862 of the second repeater 804 and the transmission antenna 852 of the first repeater 802. In another aspect, the one or more conductive films may not include openings to increase antenna-to-antenna isolation between the transmission antennas 852, 854, between the coupling antenna 856, 860 of the first repeater 802 and the transmission antenna 854 of the second repeater 804, and/or between the coupling antenna 858, 862 of the second repeater 804 and the transmission antenna 852 of the first repeater 802.

Figure 9:
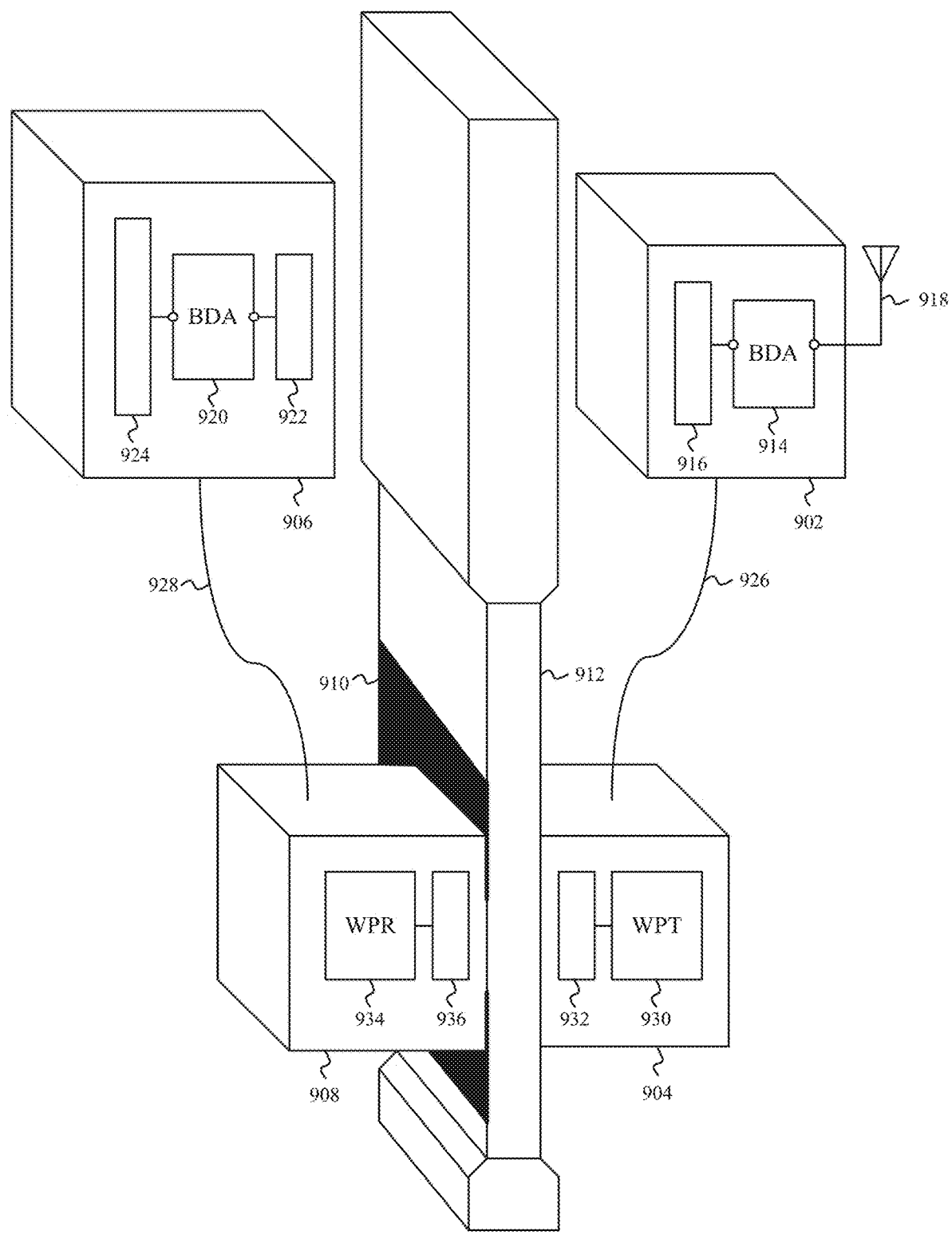
FIG. 9 depicts a wireless system, in accordance with yet another example.

FIG. 9 depict a wireless system, in accordance with another example. In one aspect, the wireless system includes a first repeater 902, a first wireless power unit 904, a second repeater 906, and a second wireless power unit 908. The wireless system may optionally include one or more conductive films 910 for disposition on a structural element 912 between the first and second wireless power units 904, 906.

In one aspect, the first repeater 902 can include one or more bi-directional amplifiers (BDA) 914, one or more RF coupling antennas 916, and one or more optional transmission antennas 918. In one aspect, the second repeater 906 can include one or more bi-directional amplifiers 920, one or more RF coupling antennas 922, and one or more optional transmission antennas 924. The one or more bi-directional amplifiers 914, one or more RF coupling antennas 916 and one or more transmission antennas 916 of the first repeater 902, and the one or more bi-directional amplifiers 920, one or more RF coupling antennas 922 and one or more transmission antennas 924 of the second repeater 906 can function as described above with regard to FIGS. 2A-8.

In one aspect, the first wireless power unit 904 can be coupled to the first repeater 902 by one or more conductive power links 926, and the second wireless power unit 908 can be coupled to the second repeater 906 by one or more conductive power links 928. In one instance, the conductive power links 926, 928 may be one or more cables configured to electrically couple the first and second wireless power units 904, 908 to the respective first and second repeaters 902, 906. In one aspect, the first wireless power unit 904 can include a wireless power transmitter (WPT) 930 and a power coupler 932. In one aspect, the second wireless power unit 908 can include a wireless power receiver (WPR) 934 and a power coupler 936. In one aspect, the wireless power transmitter 930 can convert a portion of Direct Current (DC) or Alternating Current (AC) electrical power received from a power source of the first repeater 902 to a RF power signal. The RF power signal can be transmitted from the power coupler 932 of the first wireless power unit 904 through the structural element 912 and received by the power coupler 936 of the second wireless power unit 908. The wireless power receiver 908 can convert the RF power signal received by the power coupler 936 into DC or AC electrical power. The DC or AC electrical power from the wireless power receiver 934 can power the second repeater 906. In one instance, the wireless power transmitter 930 can transmit power to the wireless power receiver 934 to enable generation of approximately 500 mA of steady state current, 1000 mA of peak current draw, and approximately 5-7.5 W of total power for use by the circuits of the second repeater 906.

In another aspect, the first wireless power unit 904 can include an optical power transmitter, and the second wireless power unit 908 can include an optical power receiver. In one aspect, the optical power transmitter can convert a portion of DC or AC power received from a power source of the first repeater 902 to optical energy. The optical energy can be transmitted from optical power transmitter through a transparent or substantially transparent structural element 912, such as a window or windshield, and received by the optical power receiver. A structural element 912 can be substantially transparent when it has a visible light transmittance of 70% or more. The wireless power receiver can convert the received optical energy into DC or AC power. The DC or AC power from the optical power receiver can power the second repeater 906. In one instance, the optical power transmitter 930 can transmit power to the optical power receiver 934 to enable generation of approximately 500 mA of steady state current, 1000 mA of peak current draw, and approximately 5-7.5 W of total power for use by the circuits of the second repeater 906.

In one instance, the optical power transmitter 930 may transmit the power as laser light to the optical power receiver 934. The laser light may be defocused in the optical power transmitter 930 to prevent the laser light from damaging the structural element 912 or harming individuals. Alternatively or in addition, the optical power transmitter 930 may initially transmit a relatively low power level of laser light. The relatively low power laser light received at the optical power receiver 934 can be measured to determine, as a safety mechanism, if the optical power transmitter 930 and the optical power receiver 934 are aligned. If the optical power transmitter 930 and optical power receiver 934 are determined to be aligned, the output power level of the laser light transmitted by the optical power transmitter 930 may be increase to a higher power level to power the second repeater 906.

In one aspect, the combination of the first wireless power unit 904 coupled to the first repeater 902 by one or more conductive power links 926, and the second wireless power unit 908 coupled to the second repeater 906 by one or more conductive power links 928 advantageously enables the first and second wireless power units 904, 908 to be placed on a structural element 912 such as a window or windshield adapted for transferring power between the wireless power units 904, 908. The first and second repeaters 902, 906 in turn can be place on a different structural element adapted for transferring RF signals between the repeaters 902, 906 or desired placement of the transmission antennas 918, 924 of the repeaters 902, 906. The separate first and second wireless power units 904, 908, will typically have a reduced form factor which may advantageously reduce the visible obstruction of the first and second wireless power unit 904, 908 when placed for example on a windshield and the first and second repeaters 902, 906 are placed on a car body panel. The separate first and second wireless power units 904, 908 may also advantageously be sold separately from the first and second repeaters 902, 906 so that customers can choose the wireless power function as a peripheral depending upon the particular customer's application for example, and also advantageously be added later as a particular customer's application changes.

Figure 10:
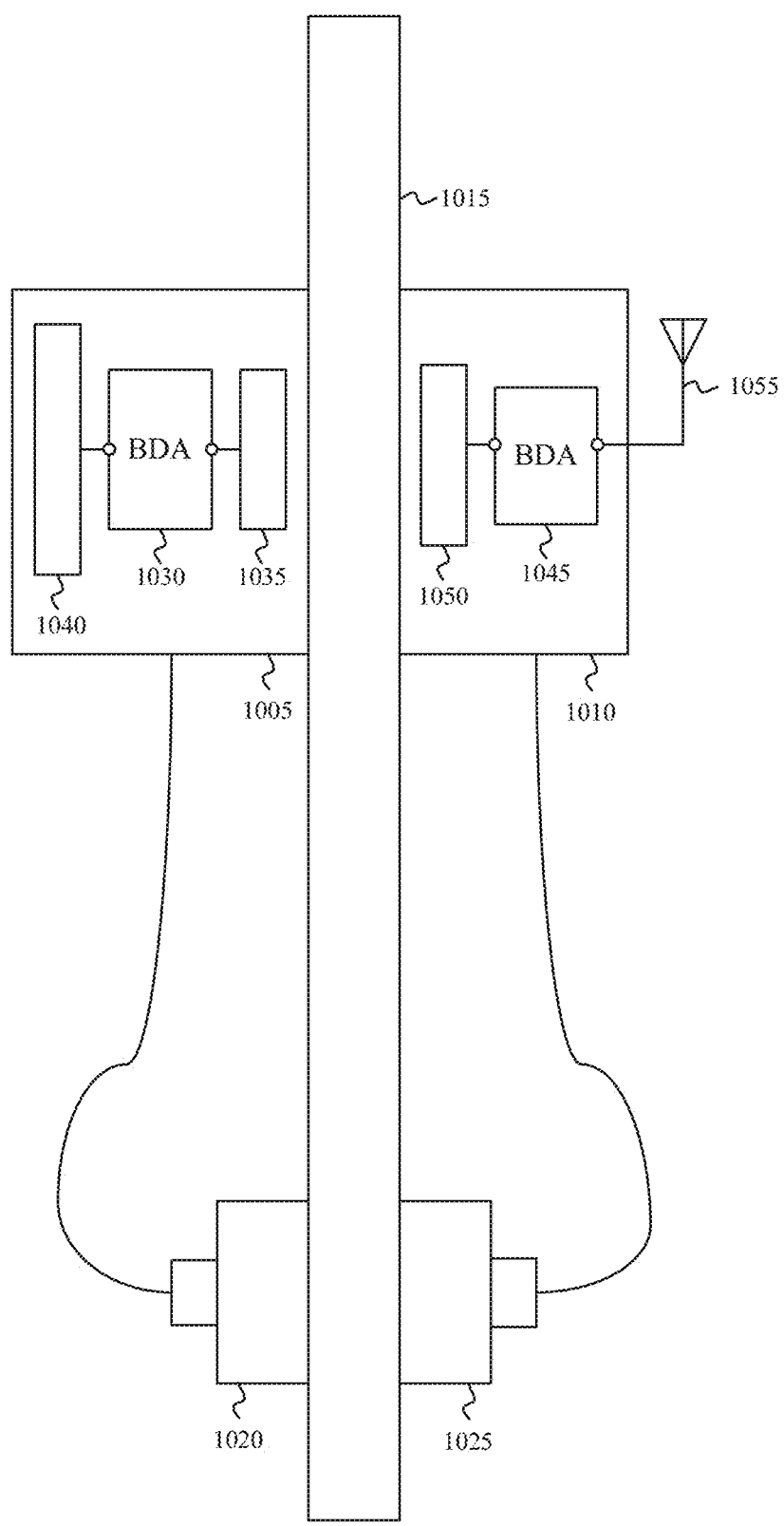
FIG. 10 depicts a wireless system, in accordance with yet another example.

FIG. 10 depict a wireless system, in accordance with another example. In one aspect, the wireless system includes a first repeater 1005 and a second repeater 1010. In one aspect, the first repeater 1005 is configured to compensate for RF transmission loss across a structural element 1015 disposed between the first and second repeaters 1005, 1010. In another aspect, the second repeater 1010 is configured to compensate for RF transmission loss across the structural element 1015. In yet another aspect, the first repeater 1005 is configured to compensate for a first portion of the RF transmission loss and the second repeater 1010 is configured to compensate for a second portion of the RF transmission loss across the structural element 1015.

In one aspect, the first repeater 1005 can be disposed outside a structure and the second repeater 1010 can be disposed inside the structure. In one instance, the structure can be a residential or commercial building. In one instance, the structural element 1015 can be a wall, door or window of the building. In another instance, the structure can be a vehicle such as a car, bus, train, truck, boat, or recreational vehicle (RV). In one aspect, the first repeater is coupled to power outside the structure. In one instance, the structural element 1015 can be a windshield or window of the vehicle.

In one aspect, the first repeater 1005 can be coupled to power outside the structure, and the second repeater 1010 can be coupled to power inside the structure. In one instance, the first repeater 1005 can be plugged into an outside electrical outlet 1020, and the second repeater 1010 can be plugged into an inside electrical outlet 1025 of the structure. In another instance, the first repeater 1005 can be wired to a battery of the vehicle, and the second repeater 1010 can be plugged into a power outlet within the vehicle.

In one aspect, the first repeater 1005 can include one or more bi-directional amplifiers (BDA) 1030, one or more RF coupling antennas 1035, and one or more optional transmission antennas 1040. In one aspect, the second repeater 1010 can include one or more bi-directional amplifiers 1045, one or more RF coupling antennas 1050, and one or more optional transmission antennas 1055. The one or more bi-directional amplifiers 1030, one or more RF coupling antennas 1035 and one or more transmission antennas 1040 of the first repeater 1005, and the one or more bi-directional amplifiers 1045, one or more RF coupling antennas 1050 and one or more transmission antennas 1055 of the second repeater 1010 can function as described above with regard to FIGS. 2A-8.

The wireless system may optionally include one or more conductive films for disposition on a structural element 1015 between the first and second repeater 1005, 1010. In one aspect, the one or more conductive films can be transparent or substantially transparent films. A conductive film can be substantially transparent when it has a visible light transmittance of 70% or more. In one instance, the transparent conductive films may be a film of thin metal wires. The visibility of the one or more conductive films can be relatively low such that individuals can readily see through the conductive films. In one instance, a conductive film disposed between the first and second repeaters 1005, 1010 can be placed on one side or the other of the structural element 1015. In another instance, conductive films disposed between the first and second repeaters 1005, 1010 can be placed on both side of the structural element 1015. In one aspect, the one or more conductive films include openings that can be disposed between the RF coupling antennas 1035, 1050 to permit RF communications signal to readily couple between the first and second repeaters 1005, 1010. The conductive film can, however, block other conductive paths of the RF signals between the first and second repeater 1005, 1010 thereby reducing feedback. The conductive film therefore can be utilized to increase antenna-to-antenna isolation between the transmission antennas 1040, 1055, between the coupling antenna 1035 of the first repeater 1005 and the transmission antenna 1055 of the second repeater 1010, and/or between the coupling antenna 1050 of the second repeater 1010 and the transmission antenna 1040 of the first repeater 1005. In another aspect, the one or more conductive films may not include openings to increase antenna-to-antenna isolation between the transmission antennas 1040, 1055, between the coupling antenna 1035 of the first repeater 1005 and the transmission antenna 1055 of the second repeater 1010, and/or between the coupling antenna 1050 of the second repeater 1010 and the transmission antenna 1040 of the first repeater 1010.

Figure 11:
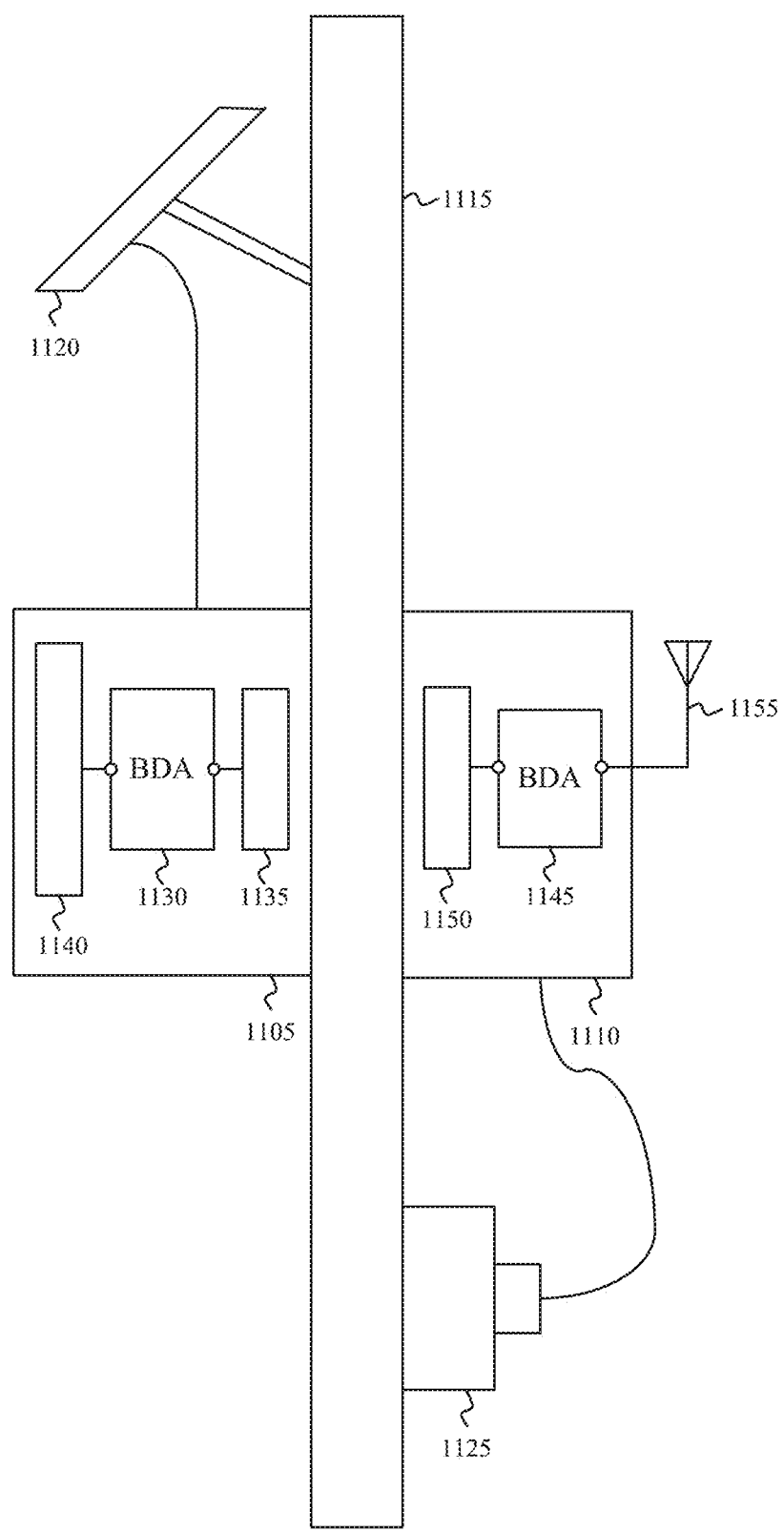
FIG. 11 depicts a wireless system, in accordance with yet another example.

FIG. 11 depict a wireless system, in accordance with another example. In one aspect, the wireless system includes a first repeater 1105 and a second repeater 1110. In one aspect, the first repeater 1105 is configured to compensate for RF transmission loss across a structural element 1115 disposed between the first and second repeaters 1105, 1110. In another aspect, the second repeater 1110 is configured to compensate for RF transmission loss across the structural element 1115. In yet another aspect, the first repeater 1105 is configured to compensate for a first portion of the RF transmission loss and the second repeater 1110 is configured to compensate for a second portion of the RF transmission loss across the structural element 1115.

In one aspect, the first repeater 1105 can be disposed outside a structure and the second repeater 1110 can be disposed inside the structure. In one instance, the structure can be a residential or commercial building. In one instance, the structural element 1115 can be a wall, door or window of the building. In another instance, the structure can be a vehicle such as a car, bus, train, truck, boat, or recreational vehicle (RV). In one instance, the structural element 1115 can be a windshield or window of the vehicle.

In one aspect, the first repeater 1105 can be power by a solar panel, and the second repeater 1110 can be coupled to power inside the structure. In one instance, the first repeater 1105 can be wired to a solar panel 1120 on the outside of the structure, and the second repeater 1110 can be plugged into an inside electrical outlet 1125 of the structure. In another instance, the first repeater 1105 can be wired to a solar panel mounted on a vehicle, and the second repeater 1110 can be plugged into a power outlet within the vehicle.

In one aspect, the first repeater 1105 can include one or more bi-directional amplifiers (BDA) 1130, one or more RF coupling antennas 1135, and one or more optional transmission antennas 1140. In one aspect, the second repeater 1110 can include one or more bi-directional amplifiers 1145, one or more RF coupling antennas 1150, and one or more optional transmission antennas 1155. The one or more bi-directional amplifiers 1130, one or more RF coupling antennas 1135 and one or more transmission antennas 1140 of the first repeater 1105, and the one or more bi-directional amplifiers 1145, one or more RF coupling antennas 1150 and one or more transmission antennas 1155 of the second repeater 1110 can function as described above with regard to FIGS. 2A-8.

The wireless system may optionally include one or more conductive films for disposition on a structural element 1115 between the first and second repeater 1105, 1110. In one aspect, the one or more conductive films can be transparent or substantially transparent films. A conductive film can be substantially transparent when it has a visible light transmittance of 70% or more. In one instance, the transparent conductive films may be a film of thin metal wires. The visibility of the one or more conductive films can be relatively low such that individuals can readily see through the conductive films. In one instance, a conductive film disposed between the first and second repeaters 1105, 1110 can be placed on one side or the other of the structural element 1115. In another instance, conductive films disposed between the first and second repeaters 1105, 1110 can be placed on both side of the structural element 1115. In one aspect, the one or more conductive films include openings that can be disposed between the RF coupling antennas 1135, 1150 to permit RF communications signal to readily couple between the first and second repeaters 1105, 1110. The conductive film can, however, block other communication paths of the RF signals between the first and second repeater 1105, 1110 thereby reducing feedback. The conductive film therefore can be utilized to increase antenna-to-antenna isolation between the transmission antennas 1140, 1155, between the coupling antenna 1135 of the first repeater 1105 and the transmission antenna 1155 of the second repeater 1110, and/or between the coupling antenna 1150 of the second repeater 1110 and the transmission antenna 1140 of the first repeater 1105. In another aspect, the one or more conductive films may not include openings to increase antenna-to-antenna isolation between the transmission antennas 1140, 1155, between the coupling antenna 1135 of the first repeater 1105 and the transmission antenna 1155 of the second repeater 1110, and/or between the coupling antenna 1150 of the second repeater 1110 and the transmission antenna 1140 of the first repeater 1105.

Figure 12:
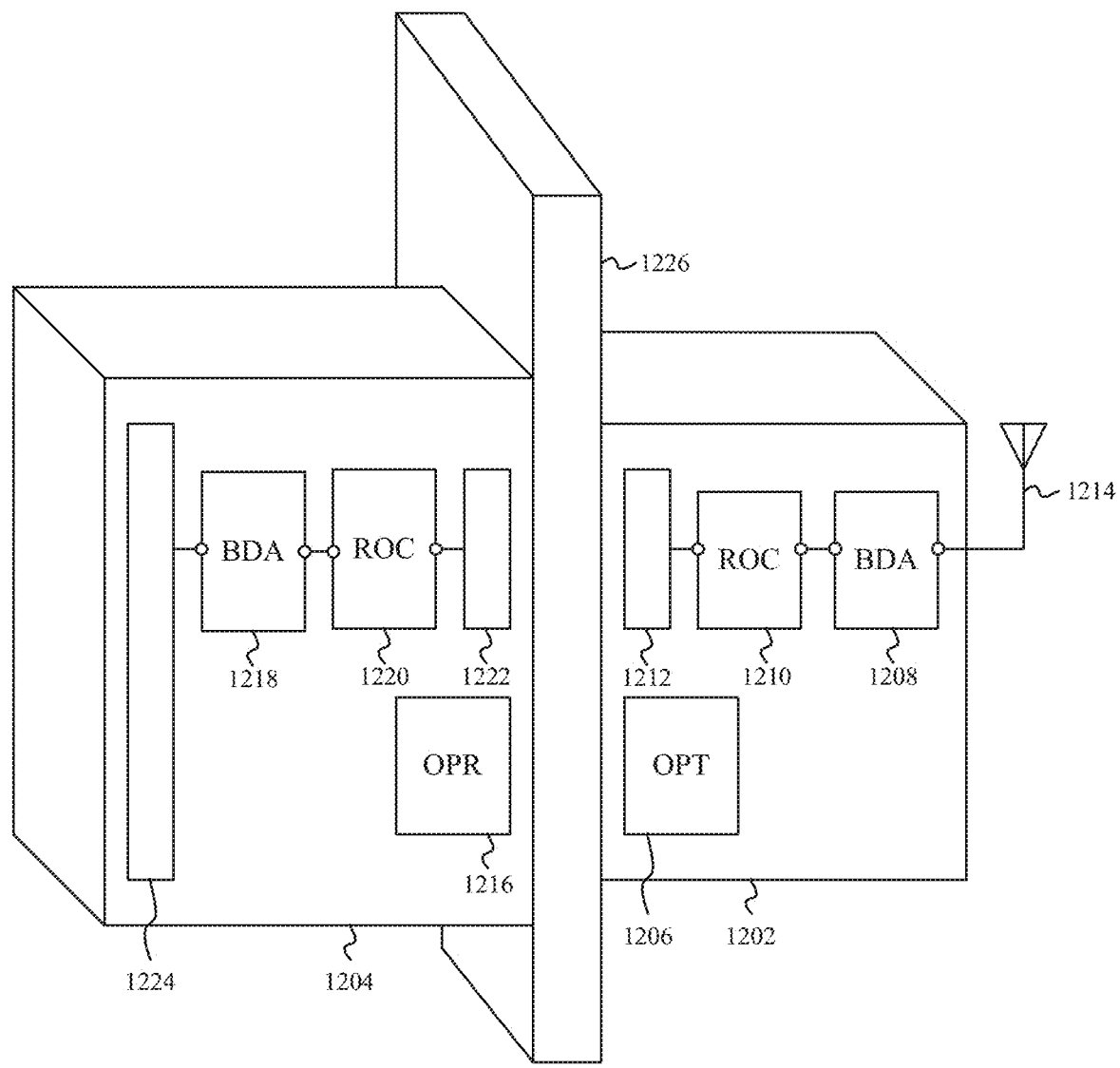
FIG. 12 depicts a wireless system, in accordance with yet another example.

FIG. 12 depicts a wireless system, in accordance with another example. In one aspect, the wireless system includes a first repeater 1202 and a second repeater 1204. In one aspect, the first repeater 1202 can include an optical power transmitter (OPT) 1206, one or more bi-directional amplifiers (BDA) 1208, one or more RF-optical converters (ROC) 1210, one or more optical signal transceivers 1212, and one or more optional transmission antennas 1214. In one aspect, the second repeater 1204 can include an optical power receiver (OPR) 1216, one or more bi-directional amplifiers (BDA) 1218, one or more RF-optical converters (ROC) 1220, one or more optical signal transceivers 1222, and one or more optional transmission antennas 1224. The first and second repeaters 1202 and 1204 can be disposed about a structural element 1226. The one or more bi-directional amplifiers 1208 of the first repeater 1202, and the one or more bi-directional amplifiers 1218 of the second repeater 1204 can function as described above with regard to FIG. 2.

In one aspect, the one or more RF-optical converters (ROC) 1210 can be coupled between the one or more bi-direction amplifiers (BDA) 1208 and the one or more optical signal transceivers 1212 of the first repeater 1202. The RF-optical converters (ROC) 1210 can convert one or more RF communication signals from the one or more bi-directional amplifiers (BDA) 1208 to one or more optical communication signals for the one or more optical signal transceivers 1212. The RF-optical converters (ROC) 1210 can also convert one or more optical communication signals from the one or more optical transceivers 1212 to one or more RF communication signals for the one or more bi-directional amplifiers (BDA) 1208. Similarly, one or more RF-optical converters (ROC) 1220 can be coupled between the one or more bi-direction amplifiers (BDA) 1218 and the one or more optical signal transceivers 1222 of the second repeater 1204. The RF-optical converters (ROC) 1220 can convert one or more RF communication signals from the one or more bi-directional amplifiers (BDA) 1218 to one or more optical communication signals for the one or more optical signal transceivers 1222. The RF-optical converters (ROC) 1220 can also convert one or more optical communication signals from the one or more optical transceivers 1222 to one or more RF communication signals for the one or more bi-directional amplifiers (BDA) 1218.

In one aspect, the structural element 1226, such as a window, windshield or similar transparent element can appreciably reduce the signal strength of RF communication signals, such as uplink and downlink 3GPP LTE signals. Therefore, the RF-optical converters (ROC) 1210, 1220 can up-convert RF signals to optical signals and down-convert optical signal to RF signals. The optical signals can then be readily transmitted between the optical transceivers 1212, 1222 through one or more transparent or substantially transparent structural elements 1226. A structural element 1226 can be substantially transparent when it has a visible light transmittance of 70% or more. The term optical signal is not intended to be limiting. In one example, an optical signal, as used herein, can include a microwave frequency, a millimeter wave frequency, a terahertz frequency, or an optical frequency. Typically, a radio frequency is selected that has a lower loss through glass relative to a loss of the RF communication signals communicated between the device 110 and the base station 120 tower (see FIG. 1), when transmitted through glass.

In one aspect, the optical power transmitter 1206 can convert a portion of DC or AC power received from a power source of the first repeater 1202 to optical energy. The optical energy can be transmitted from optical power transmitter 1206 of the first repeater 1202 through a transparent or substantially transparent structural element 1226, such as a window, and received by the optical power receiver 1216 of the second repeater 1204. A structural element 1226 can be substantially transparent when it has a visible light transmittance of 70% or more. The wireless power receiver 1216 can convert the received optical energy into DC or AC power. The DC or AC power from the optical power receiver 12116 can power the bi-directional amplifier 1218, RF-optical converters 1220 or any other circuits, as necessary, of the second repeater 1204.

Figure 13:
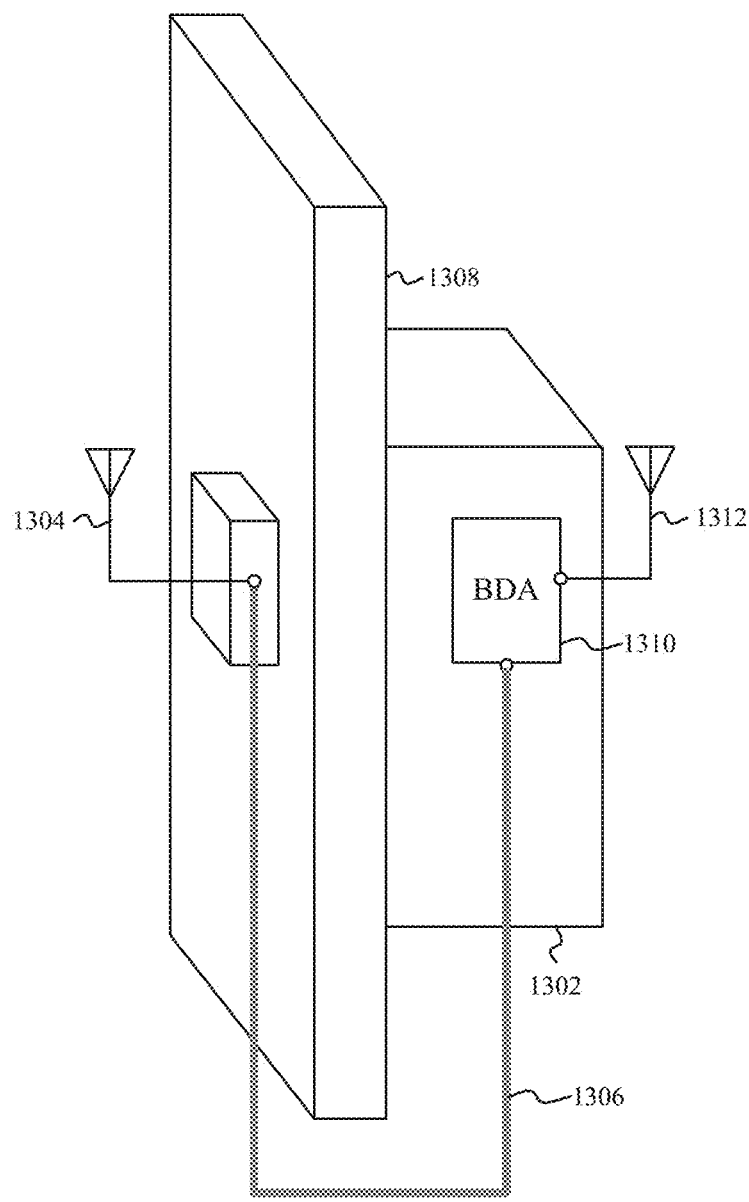
FIG. 13 depicts a wireless system, in accordance with yet another example.

FIG. 13 depicts repeater system, in accordance with another example. In one aspect, the system includes a repeater 1302, an antenna 1304 and a flat cable 1306. The repeater 1302 and antenna 1304 are adapted for disposition opposite each other about a structural element 1308, such as a window, door or similar element. When the repeater 1302 and antenna 1304 are mounted on either side of a structural element they comprise a closely-contained system. Alternatively, the repeater 1302 and antenna 1304 may not be disposed opposite each other about the structural element 1308. In one instance, the repeater 1302 can be an inside repeater adapted for placement within a structure, and the antenna 1304 can be adapted for placement outside the structure attached to a window, wall or the like. In one aspect, the antenna can be a passive antenna. Alternatively, an antenna with an amplifier or other active components may be used.

In one aspect, the repeater can include one or more bi-directional amplifiers (BDA) 1310, and one or more optional transmission antennas 1312. The one or more transmission antennas 1312 may be integral to the repeater 1302, or may be separate from the first repeater 1302, but removably coupled to the bi-directional amplifier 1310 (e.g., remote external transmission antenna), optionally by one or more wired communication links (e.g., coaxial cable). The one or more bi-directional amplifiers 1310 can function as described above with regard to FIG. 2. In one aspect, the passive antenna 1304 can include an antenna, mounting structure and connector. The mounting structure can be adapted to be attached to the structural element 1302. The connecter can be adapted to couple the antenna to the flat cable 1306. The passive antenna can be a directional antenna adapted for fixed structures such as buildings, or an omni-directional antenna for mobile structures such as vehicles.

In one aspect, the flat cable 1306 can couple the repeater 1302 to the passive antenna 1304. In one aspect, the flat cable can include a body with a first coupler for coupling the repeater 1302 to a first end of the body and a second coupler for coupling to the passive antenna 1304 to a second end of the body. In one aspect, the body may include an approximately square or rectangular cross-sectional shape. The body may include a strip-line of sufficient width and dimensions such that general strip-line electromagnetic field principles apply to the body. The body may be formed using materials for printed circuit boards. In particular, the body may be formed using materials for flexible printed circuit boards. Alternatively, a polyimide film, such as Kapton, may be used to form selected layers of the body. In some embodiments, the body may be constructed using material such that a general geometry of the body does not substantially change with the application of a perpendicular force to the body.

In one aspect, the flat cable 1306 includes a first ground layer, a second ground layer, a dielectric material, and a strip-line. The first ground layer and the second ground layer may be outer surfaces of two of the sides of the flat cable 1306, such that the dielectric material and the strip-line are positioned between the first and second ground layers.

In one aspect, the ground layer can be substantially flat. The dielectric material can also be formed of layers. For example, a first dielectric layer may be located below the strip-line. A second dielectric layer may be located above the strip-line. Each dielectric layer can be substantially flat and positioned in parallel to the ground layer. The strip-line can be parallel to the ground layer and the layers of the dielectric material. The top ground layer can be substantially flat and parallel to the dielectric layers, strip-line, and ground layer. The top ground layer, dielectric layers, strip-line, and bottom ground layer can form a vertical sandwich that comprises the flat cable 1306.

In one aspect, the ground layers can be comprised of a solid conductor. Alternatively, the ground layers can be configured as a braided wire, or wire thread mesh, comprised of a plurality of thinner wires to form a ground layer. The first ground layer may have a thickness that may be similar or different. In some embodiments, the thickness may range between 10 micrometers ($\mu$m) and 100 $\mu$m each. A thickness of each individual strand in the braided wire or wire thread mesh may be less than a thickness of a solid conductor. The reduced thickness of each strand can allow the flat cable 1306 to have a shorter bend radius without damaging or kinking the ground layers since the thinner conductors forming the braided wire or wire thread can be bent at a shorter bend radius without significantly changing the impedance or other radio frequency characteristics of the flat cable 1306 relative to a thicker, solid conductor ground layer. The type of braided wire or wire thread mesh can depend on the frequency of the signal traveling over the flat cable 1306. The braided wire or wire thread mesh can be configured to have through holes that are substantially smaller than a wavelength of the signal. For example, less than $\frac{1}{2}$, $\frac{1}{4}$, $\frac{1}{8}$, or $\frac{1}{16}^{th}$ of the wavelength of the signal traveling over the cable.

The first ground layer may be formed of a solid flexible conductor. Alternately or additionally, the first ground layer may be formed from a hatched, stranded, or other type of flexible conductor. The conductor types used in the first ground layer may be copper, Kapton, gold, silver, or aluminum, among other types of conductors. The second ground layer may be formed in a manner analogous to the first ground layer with a similar material or the second ground layer may be different from the first ground layer.

In one aspect, the strip-line may be configured to be approximately centered between the first and second ground layers and approximately centered between lateral edges of the first and second ground layers. Alternately or additionally, the strip-line may be configured to be offset from the center between the first and second ground layers and/or offset from the center between lateral edges of the first and second ground layers. The strip-line may include a conductive material and may be configured to carry a signal through the flat cable 1306. For example, the conductive material may be copper, Kapton, silver, gold, or aluminum, among other types of conductive material. In one example embodiment, a conductive tape, such as 3M® 1170, 1181, 1182, 1183, 1190, 1194, or 1245 may be used.

In one aspect, the strip-line may have a thickness and a width. In some embodiments, the width may be at least twice as large as the thickness. In some embodiments, the width may be such that strip-line electromagnetic field theory may be applied to understand the electromagnetic effect to a signal traversing the strip-line. In some embodiments, the thickness may be between 35 and 150 $\mu$m.

In one aspect, the strip-line may be sized and the conductive material for the strip-line may be selected such that the strip-line provides a particular impedance, such as 50 or 75 ohms. In these and other embodiments, the particular impedance may be selected and the strip-line may be sized and the conductive material selected based on a system within which the flat cable 1306 may be configured to operate. For example, the impedance of the strip-line may be designed to substantially match an impedance of the system within which the flat cable 1306 is configured to operate.

In one aspect, the strip-line can be configured to carry a direct current (DC) signal and an alternating current (AC) signal. The DC signal may be used to provide power. The AC signal may be used to carry information. In one aspect, the DC signal and/or AC signal can be used to power an active antenna, such as an antenna with an amplifier or other types of powered, active components.

In one aspect, the strip-line can be formed of a single conductor. The single conductor may be a wire. Alternatively, the strip line can be printed on a surface, such as a surface of a dielectric layer.

In one aspect, the dielectric material may surround the strip-line to insulate the strip-line from the first and second ground layers. In these and other embodiments, the dielectric material may contact the first and second ground layers and may extend between the lateral edges of the first and second ground layers. The dielectric may be formed of any dielectric material or combination of dielectric materials, including silicon, silicon-oxides, Kapton, and polymers, among other dielectrics. The dielectric material may include a thickness between the first and second ground layers. In some embodiments, multiple layers of dielectric material may be stacked vertically to provide a desired impedance, such as 50 ohms or 75 ohms or another desired impedance. The thickness of each dielectric layer may range between 150 and 1500 µm. In some embodiments, the thickness may be configured such that a minimum distance between the strip-line and either of the first and second ground layers is greater or less than the thickness of the strip-line.

In one aspect, a thickness of the flat cable 1306 may range between 190 µm and 3000 µm. The flat cable 1306 may also be configured to be flexible. In these and other embodiments, each of the first ground layer, the second ground layer, the dielectric material, the strip-line may be formed of materials and formed in a particular shape and manner such that each of the first ground layer, the second ground layer 4, the dielectric material, the strip-line may have a stiffness that is within a range of stiffness that would allow a typical person to bend the flat cable 1306 with their hands without using any tools. Furthermore, the combination and arrangement of the first ground layer, the second ground layer, the dielectric material, and the strip-line may be such that the stiffness of the flat cable 1306 is within a range of stiffness that would allow a typical person to bend the flat cable 1306 with their hands without using any tools. In one example, the flat cable 1306 can be configured to have a bend radius of 10 mm or less.

In one aspect, the flat cable 1306 can be assembled using an adhesive material to join the first ground layer, the second ground layer, the dielectric material, and the strip-line. The adhesive can be selected based on the components used to form the various materials. The adhesive can be selected to have good radio frequency properties to minimize radio frequency losses within the flat cable 1306.

In one aspect, the thickness and flexibility of the flat cable 1306 may allow the flat cable 1306 to be placed between a window and a window sash such that when the window is closed there is a minimum seal gap or minimum change in the ability of the window to close properly. The cable can be configured such that the perpendicular forces and the bending applied to the body of the cable, when the cable is placed between the window and the window sash, will not substantially change a geometry of the body of the cable. Minimizing the change in the geometry of the body when force is applied and bending occurs enables the flat cable 1306 to have substantially the same impedance and radio frequency characteristics.

In one aspect, if the dimensions of selected layers change, such as the dimensions of the dielectric material changing relative to the dimensions of the strip-line, it can cause changes in impedance in the flat cable 1306, which can result in a significant impedance loss. A typical round coaxial cable may have its dielectric layer crushed (i.e. reduced in width relative to the center conductor) when the coaxial cable is closed in a window or other type of enclosure, thereby resulting in a significant change in impedance in the coaxial cable. The substantially flat cable 1306 can be enclosed in a window with minimal changes in the geometry of the body, thereby reducing any change in impedance when the window is closed, locked, and/or sealed around the flat cable 1306.

For example, in some embodiments, a change in insertion loss can occur for a flat cable, such as flat cable 1306, that is compressed and/or bent by placing the cable between two surfaces, such as between a window and a window sash, with the window closed or sealed or locked. The insertion loss can be measured at a desired frequency for the flat cable. In some examples, the insertion loss can be measured over a bandwidth of 600 Megahertz (MHz) to 2700 MHz. In other embodiments, the insertion loss can be measured at 500 MHz to 4000 MHz. In one example, insertion loss and return loss can be measured at a center frequency of 2000 MHz over a selected bandwidth.

The change in insertion loss for the flat cable 1306, due to bending or compression when the cable is placed between two surfaces, can be from less than 0.1 dB to 1 dB, relative to an insertion loss of the flat cable 1306 when the cable is not compressed or bent by two surfaces, such as the closed window or other type of a threshold.

The change in impedance or other radio frequency characteristics due to bending and compression can also be measured by a change in return loss. The flat cable 1306 may have a return loss of greater than 10 dB when the cable is not compressed or bent. When the cable is compressed or bent between surfaces, such as the window and the window sash, the return loss may decrease from less than 0.1 dB to 2 db.

Figure 14:
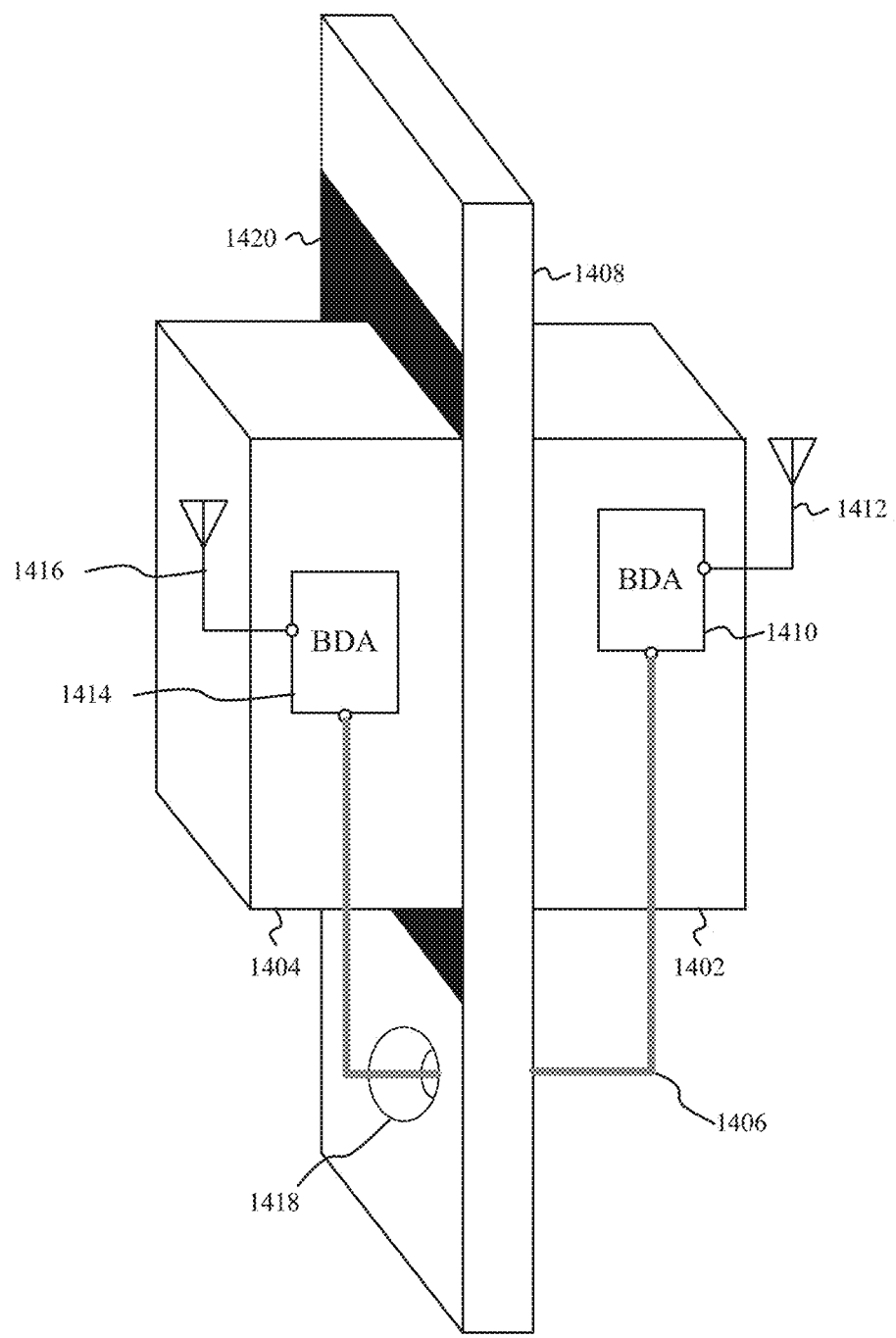
FIG. 14 depicts a wireless system, in accordance with yet another example.

FIG. 14 depicts repeater system, in accordance with another example. In one aspect, the system includes a first repeater 1402, a second repeater 1404 and a cable or connector 1406. The first and second repeaters 1402, 1404 are adapted for disposition about a structural element 1408, such as a window, door or similar element. The first repeater 1402 can also be plugged into an electric output of the structure to power the first and second repeaters 1402, 1404.

In one aspect, the first repeater 1402 can include one or more bi-directional amplifiers (BDA) 1410, and one or more optional transmission antennas 1412. The one or more transmission antennas 1412 may be integral to the first repeater 1402, or may be separate from the first repeater 1402, but removably coupled to the bi-directional amplifier 1410 (e.g., remote external transmission antenna), optionally by one or more wired communication links (e.g., coaxial cable). The one or more bi-directional amplifiers 1410 can function as described above with regard to FIG. 2. Similarly, the second repeater 1404 can include one or more bi-directional amplifiers (BDA) 1414, and one or more optional transmission antennas 1416. The one or more transmission antennas 1416 may be integral to the second repeater 1404, or may be separate from the second repeater 1404, but removably coupled to the bi-directional amplifier 1414 (e.g., remote external transmission antenna), optionally by one or more wired communication links (e.g., coaxial cable). The one or more bi-directional amplifiers 1414 can function as described above with regard to FIG. 2. The transmission antennas 1412, 1416 of the first and second repeaters 1402, 1404 can be directional antennas adapted for fixed structures such as buildings, or an omni-directional antenna for mobile structures such as vehicles.

In one aspect, the cable or connector 1406 can couple the first and second repeaters 1402, 1404 through an opening 1418 in the structural element 1408. In one instance, the opening 1418 can be a hole prefabricated in a structural element 1408 such as a window. In another instance, the opening 1418 can be hole drilled in the structural element 1408 such as a window during the installation of the first and second repeaters 1402, 1404. In one instance the opening 1418 that the cable or connector 1406 passes through may be located adjacent to the first and second repeaters 1402, 1404. In another instance, the opening 1418 may be located directly between the first and second repeaters 1402, 1404, so that the cable or connector 1406 is directly between the first and second repeaters 1402, 1404. Accordingly, the repeater system is integrated with a structural element 1408, such as a window.

In one aspect, one or more conductive films 1420 may be disposed between the first and second repeaters 1402, 1404 to improve isolation between the transmission antenna ports. Optionally, one or more thermal or optical coatings applied to the structural element 1408, such as window glazing, can provide improved isolation between the transmission antenna ports.

Figure 15:
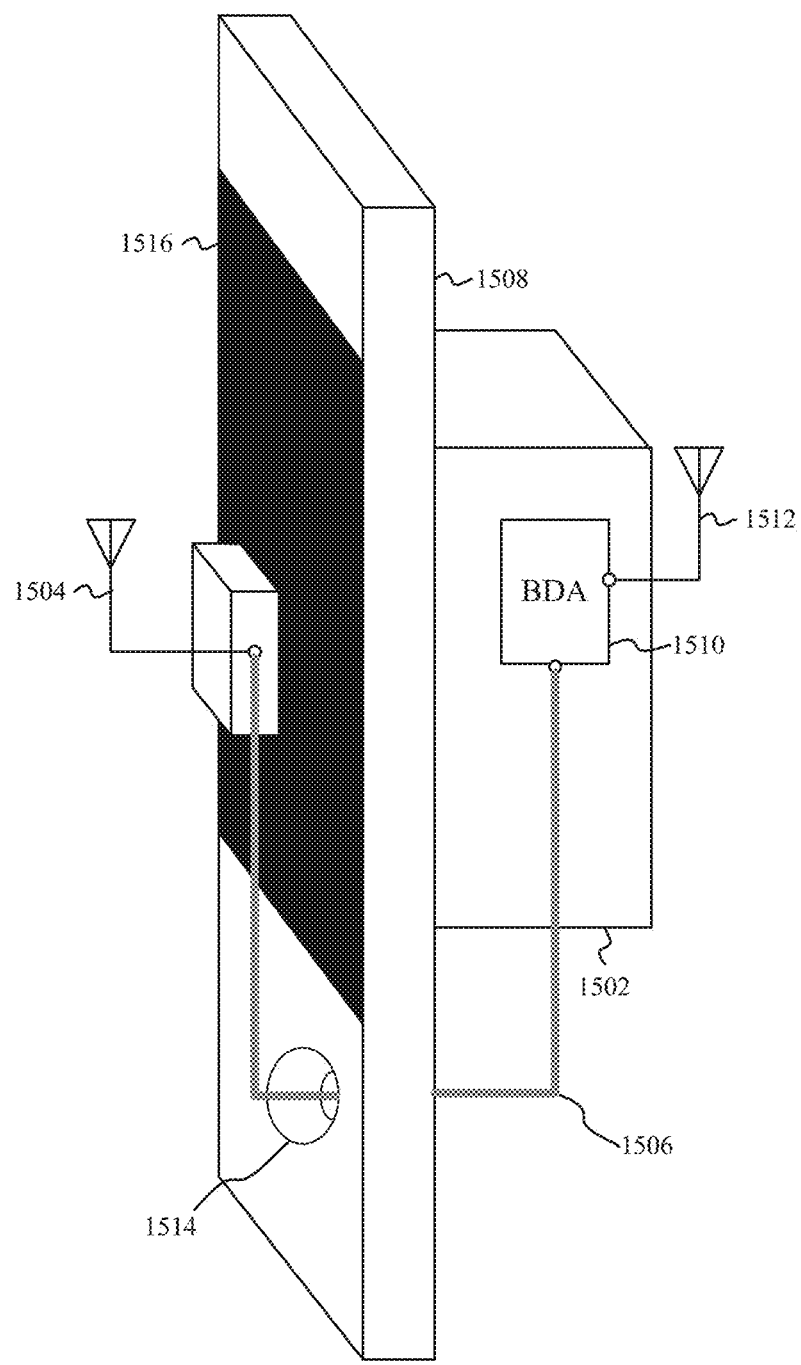
FIG. 15 depicts a wireless system, in accordance with yet another example.

FIG. 15 depicts repeater system, in accordance with another example. In one aspect, the system includes a repeater 1502, an antenna or passive re-radiation system 1504 and a cable or connector 1506. The repeater 1502 and antenna 1504 are adapted for disposition about a structural element 1508, such as a window, door or similar element. The repeater 1502 can also be plugged into an electric output of the structure.

In one instance, the repeater 1502 can be an inside repeater adapted for placement within a structure, and the antenna or passive re-radiation system 1504 can be adapted for placement outside the structure attached to a window, wall or the like. In one aspect, the repeater 1502 can include one or more bi-directional amplifiers (BDA) 1510, and one or more optional transmission antennas 1512. The one or more transmission antennas 1412 may be integral to the repeater 1402, or may be separate from the repeater 1402, but removably coupled to the bi-directional amplifier 1410 (e.g., remote external transmission antenna), optionally by one or more wired communication links (e.g., coaxial cable). The one or more bi-directional amplifiers 1510 can function as described above with regard to FIG. 2.

In one aspect, the cable or connector 1506 can couple the repeaters 1502 through an opening 1514 in the structural element 1508 to the antenna or passive re-radiation system 1504. In one instance, the opening 1514 can be a hole prefabricated in a structural element 1508 such as a window. In another instance, the opening 1514 can be hole drilled in the structural element 1508 such as a window during the installation of the repeater 1502 and antenna or passive re-radiation system 1504. In one instance the opening 1514 that the cable or connector 1506 passed through may be located adjacent to the repeater 1502 and antenna or passive re-radiation system 1504. In another instance, the opening 1514 may be located directly between the repeater 1402 antenna or passive re-radiation system 1504, so that the cable or connector 1506 is directly between the repeater 1402 antenna or passive re-radiation system 1504. Accordingly, the repeater system is integrated with a structural element 1508, such as a window.

In one aspect, one or more conductive films 1516 may be disposed between the repeater 1502 and antenna or passive re-radiation system 1504 to improve isolation between the transmission antennas. Optionally, one or more thermal or optical coatings applied to the structural element 1508, such as window glazing, can provide improved isolation between the transmission antenna.

EXAMPLES

The following examples pertain to specific technology embodiments and point out specific features, elements, or actions that can be used or otherwise combined in achieving such embodiments.

Example 1 includes a system comprising: a first repeater including, a first wireless power unit configured to wirelessly transmit a portion of Direct Current (DC) or Alternating Current (AC) electrical power received from a power source; and a first bi-directional amplifier, configured to amplify one or more RF communication signals, wherein the first bi-directional amplifier is powered by the power source; and a second repeater including, a second wireless power unit configured to receive the wireless power, and convert the wireless power to DC or AC electrical power, and a second bi-directional amplifier, configured to amplify the one or more RF communication signals, wherein the second bi-directional amplifier is powered by the DC or AC electrical power from the second wireless power unit.

Example 2 includes the system of Example 1, wherein, the first wireless power unit includes, a wireless power transmitter configured to convert the portion of DC or AC electrical power received from the power source to a RF power signal; and a first power coupler, coupled to the wireless power transmitter, configured to transmit the RF power signal; the second wireless power unit includes, a second power coupler configured to receive the RF power signal; and a wireless power receiver, coupled to the second power coupler, configured to convert the received RF power signal to the DC or AC electrical power.

Example 3 includes the system of Example 2, wherein, the first power coupler includes an inductive coil; and the second power coupler include an inductive coil.

Example 4 includes the system of Example 2, wherein, the first power coupler includes a capacitive electrode; and the second power coupler include a capacitive electrode.

Example 5 includes the system of Example 1, wherein, the first wireless power unit includes an optical power transmitter configured to convert the portion of DC or AC electrical power received from the power source to an optical signal and transmit the optical signal; and the second wireless power unit includes an optical power receiver configured to receive the optical signal and convert the optical signal to the DC or AC electrical power.

Example 6 includes the system of Example 1, further comprising: the first repeater further including, a first RF coupling antenna coupled to the first bi-directional amplifier; the second repeater further including, a second RF coupling antenna coupled to the second bi-directional amplifier.

Example 7 includes the system of Example 6, further comprising: a conductive film configured to be disposed between the first repeater and the second repeater.

Example 8 includes the system of Example 6, further comprising: a conductive film including one or more openings configured to be disposed between the first RF coupling antenna of the first repeater and the second RF coupling antenna of the second repeater and between the first wireless power unit and the second wireless power unit.

Example 9 includes the system of Examples 7 or 8, wherein the conductive film is transparent.

Example 10 includes the system of Examples 7 or 8, wherein the conductive film comprises a film of thin metal wires.

Example 11 includes the system of Example 1, further comprising: a third repeater communicatively coupled to the first repeater by a wired communication link.

Example 12 includes the system of Example 1, further comprising: the first repeater further including, a first transmission antenna coupled to a transmission port of the first bi-directional amplifier; the second repeater further including, a second transmission antenna coupled to a transmission port of the second bi-directional amplifier.

Example 13 includes the system of Example 1, wherein, the first transmission antenna is a directional antenna; and the second transmission antenna is a directional antenna.

Example 14 includes the system of Example 1, wherein, the first transmission antenna is an omni-directional antenna; and the second transmission antenna is a directional antenna.

Example 15 includes the system of Example 1, wherein, the first repeater comprises a first Single-Input-Single-Output (SISO) repeater; and the second repeater comprises a second SISO repeater.

Example 16 includes the system of Example 1, wherein the first bi-directional amplifier is configured to compensate for RF transmission loss across a structural element disposed between the first and second repeaters.

Example 17 includes the system of Example 1, wherein the second bi-directional amplifier is configured to compensate for RF transmission loss across a structural element disposed between the first and second repeaters.

Example 18 includes a system comprising: a first repeater including, a wireless power transmitter configured to convert a portion of Direct Current (DC) or Alternating Current (AC) electrical power received from a power source to a RF power signal; a first power coupler, coupled to the wireless power transmitter, configured to transmit the RF power signal; a first RF coupling antenna; a first bi-directional amplifier, coupled to the first RF coupling antenna and configured to amplify one or more RF communication signals, wherein the first bi-directional amplifier is powered by the power source; and a second repeater including, a second power coupled configured to receive the RF power signal; a wireless power receiver configured convert the received RF power signal to DC or AC electrical power; a second RF coupling antenna; and a second bi-directional amplifier, coupled to the second RF coupling antenna and configured to amplify the one or more RF communication signals, wherein the second bi-directional amplifier is powered by the DC or AC electrical power from the wireless power receiver.

Example 19 includes the system of Example 18, wherein, the first power coupler includes an inductive coil; and the second power coupler includes an inductive coil.

Example 20 includes the system of Example 18, wherein, the first power coupler includes a capacitive electrode; and the second power coupler include a capacitive electrode.

Example 21 includes the system of Example 18, further comprising: a conductive film including one or more openings configured to be disposed between the first RF coupling antenna of the first repeater and the second RF coupling antenna of the second repeater, and between first power coupler and the second power coupler.

Example 22 includes the system of Example 18, further comprising: a first transmission antenna coupled to the first bi-directional amplifier, wherein the first transmission antenna is a directional antenna internally integral to the first repeater; and a second transmission antenna couple to the second bi-direction amplifier, wherein the second transmission antenna is an omni-directional antenna externally integral to the first repeater.

Example 23 includes a system comprising: a first repeater including, an optical power transmitter configured to convert a portion of Direct Current (DC) or Alternating Current (AC) electrical power received from a power source to an optical signal and transmit the optical signal; a first RF coupling antenna; and a first bi-directional amplifier, coupled to the first RF coupling antenna and configured to amplify one or more RF communication signals, wherein the first bi-directional amplifier is powered by the power source; and a second repeater including, an optical power receiver configured to receive the optical signal, and convert the optical signal to DC or AC electrical power; a second RF coupling antenna; and a second bi-directional amplifier, coupled to the second RF coupling antenna and configured to amplify the one or more RF communication signals, wherein the second bi-directional amplifier is powered by the DC or AC electrical power from the second wireless power unit.

Example 24 includes the system of Example 23, further comprising: one or more processors and memory configured to: configure the optical power transmitter to initially transmit at a predetermined low power level; determine if the optical power receiver is aligned with the optical power transmitter to receive the optical signal; configure the optical power transmitter to transmit at a predetermined high power level if the optical power receiver is determined to be aligned with the optical power transmitter to receive the optical signal.

Example 25 includes the system of Example 23, further comprising: a conductive film including one or more openings configured to be disposed between the first RF coupling antenna of the first repeater and the second RF coupling antenna of the second repeater, and between optical power transmitter and the optical power receiver.

Example 26 includes the system of Example 23, further comprising: a first transmission antenna coupled to the first bi-directional amplifier, wherein the first transmission antenna is a directional antenna internally integral to the first repeater; and a second transmission antenna couple to the second bi-direction amplifier, wherein the second transmission antenna is an omni-directional antenna externally integral to the first repeater.

Example 27 includes a system comprising: a first wireless power unit configured to convert a portion of Direct Current (DC) or Alternating Current (AC) electrical power received from a power source to wireless power and wirelessly transmit the wireless power; a first repeater including a first bi-directional amplifier, configured to amplify one or more RF communication signals, wherein the first bi-directional amplifier is powered by the power source; a second wireless power unit configured to receive the wireless power, and convert the wireless power to DC or AC electrical power; and a second repeater including a second bi-directional amplifier, configured to amplify the one or more RF communication signals, wherein the second bi-directional amplifier is powered by the DC or AC electrical power from the second wireless power unit.

Example 28 includes the system of Example 27, wherein, the first wireless power unit includes, a wireless power transmitter configured to convert the portion of DC or AC electrical power received from the power source to a RF power signal; and a first power coupler, coupled to the wireless power transmitter, configured to transmit the RF power signal; the second wireless power unit includes, a second power coupler configured to configured to receive the RF power signal; and a wireless power receiver, coupled to the second power coupler, configured to convert the received RF power signal to the DC or AC electrical power.

Example 29 includes the system of Example 27, wherein, the first wireless power unit includes an optical power transmitter configured to convert the portion of DC or AC electrical power received from the power source to an optical signal and transmit the optical signal; and the second wireless power unit includes an optical power receiver configured to receive the optical signal and convert the optical signal to the DC or AC electrical power.

Example 30 includes a system comprising: a first repeater disposed outside a structure and configured to amplify one or more RF communication signals, wherein the first repeater is coupled to power outside the structure; and a second repeater disposed inside the structure and configured to amplify the one or more RF communication signals, wherein the second repeater is coupled to power inside the structure.

Example 31 includes the system of Example 30, wherein the first repeater is configured to compensate for RF transmission loss across a structural element disposed between the first and second repeaters.

Example 32 includes the system of Example 30, wherein the second repeater is configured to compensate for RF transmission loss across a structural element disposed between the first and second repeaters.

Example 33 includes the system of Example 30, further comprising: a conductive film including one or more openings configured to be disposed between the first repeater and the second repeater.

Example 34 includes the system of Example 33, wherein the conductive film is transparent.

Example 35 includes the system of Example 33, wherein the conductive film comprises a film of thin metal wires.

Example 36 includes a system comprising: a first repeater disposed outside a structure and configured to amplify one or more RF communication signals, wherein the first repeater is powered by a solar panel; and a second repeater disposed inside the structure and configured to amplify the one or more RF communication signals, wherein the second repeater is powered by a source inside the structure.

Example 37 includes the system of Example 36, wherein the first repeater is configured to compensate for RF transmission loss across a structural element disposed between the first and second repeaters.

Example 38 includes the system of Example 36, wherein the second repeater is configured to compensate for RF transmission loss across a structural element disposed between the first and second repeaters.

Example 39 includes the system of Example 36, further comprising: a conductive film including one or more openings configured to be disposed between the first repeater and the second repeater.

Example 40 includes the system of Example 39, wherein the conductive film is transparent.

Example 41 includes the system of Example 39, wherein the conductive film comprises a film of thin metal wires.

Example 42 includes a system comprising: a first repeater including, an optical power transmitter configured to convert a portion of Direct Current (DC) or Alternating Current (AC) electrical power received from a power source to an optical signal and transmit the optical signal; a first optical signal transceiver; a first bi-directional amplifier configured to amplify one or more RF communication signals, wherein the first bi-directional amplifier is powered by the power source; and a first RF-optical converter, coupled between the first optical signal transceiver and the first bi-directional amplifier, and configured to convert the one or more RF communication signals from the first bi-directional amplifier to one or more optical communication signals for the first optical signal transceiver; and a second repeater including, an optical power receiver configured to receive the optical signal, and convert the optical signal to DC or AC electrical power; a second optical signal transceiver; a second bi-directional amplifier configured to amplify the one or more RF communication signals, wherein the second bi-directional amplifier is powered by the DC or AC electrical power from the second wireless power unit; and a second RF-optical converter, coupled between the second optical signal transceiver and the second bi-directional amplifier, and configured to convert the one or more optical communication signals from the second optical signal transceiver to one or more RF communication signals for the second bi-directional amplifier.

Example 43 includes the system of Example 42, wherein; the first RF-optical converter is further configured to convert the one or more optical communication signals from the first optical signal transceiver to the one or more RF communication signals for the first bi-directional amplifier; and the second RF-optical converter is further configured to convert the one or more RF communication signal from the second bi-directional amplifier to the one or more optical communication signals for the second optical signal transceiver.

Example 44 includes the system of Example 42, further comprising: a first transmission antenna coupled to the first bi-directional amplifier, wherein the first transmission antenna is a directional antenna internally integral to the first repeater; and a second transmission antenna couple to the second bi-direction amplifier, wherein the second transmission antenna is an omni-directional antenna externally integral to the first repeater.

Example 45 includes a system comprising: a transmission antenna; a repeater including a bi-directional amplifier, coupled to the transmission antenna configured to amplify one or more RF communication signals; an antenna; and a flat cable coupled between the bi-directional amplifier and the antenna.

Example 46 includes the system of Example 45, wherein the repeater and the antenna are mount on either side of a structural element as a closely-contained system.

Example 47 includes the system of Example 45, wherein the flat cable comprises: a first ground layer; a second ground layer; a strip-line positioned between the first ground layer and the second ground layer; and a dielectric material positioned between the first ground layer and the second ground layer and surrounding the strip-line to insulate the strip-line from the first ground layer and the second ground layer.

Example 48 includes the system of Example 45, wherein the transmission antenna comprises an omni-directional antenna integral to the repeater.

Example 49 includes the system of Example 45, wherein the transmission antenna comprises an omni-directional antenna removably coupled to the bi-directional amplifier.

Example 50 includes the system of Example 45, wherein the antenna comprises a directional antenna configured to attach to a structural element.

Example 51 includes the system of Example 45, wherein the antenna comprises an omni-directional antenna configured to be attached to a structural element.

Example 52 includes the system of Example 45, wherein the antenna is a passive antenna.

Example 53 includes the system of Example 45, wherein the antenna is an active antenna that receives power from the flat cable.

Example 54 includes a system comprising: a first repeater; a second repeater; a cable or connector coupled between the first repeater and the second repeater through an opening in a structural element that the first repeater and second repeater are attached to.

Example 55 includes the system of Example 54, wherein the opening in the structural element is prefabricated into the structural element.

Example 56 includes the system of Example 54, wherein the opening is the structural element is fabricated into the structural element when the repeater and antenna are installed on the structural element.

Example 57 includes the system of Example 54, wherein the structural element includes a window and the opening is a hole prefabricated in the window.

Example 58 includes the system of Example 54, wherein the structural element includes a window and the opening is a hole fabricated in the window when the repeater and antenna are installed on the window.

Example 59 includes the system of Example 54, further comprising a conductive film configured to be disposed between the first repeater and the second repeater.

Example 60 includes a system comprising: a transmission antenna; a repeater including a bi-directional amplifier, coupled to the transmission antenna configured to amplify one or more RF communication signals; an antenna; and a cable or connector coupled between the bi-directional amplifier and the antenna through an opening in a structural element that the antenna and repeater are attached to.

Example 61 includes the system of Example 60, wherein the opening in the structural element is prefabricated into the structural element.

Example 62 includes the system of Example 60, wherein the opening is the structural element is fabricated into the structural element when the repeater and antenna are installed on the structural element.

Example 63 includes the system of Example 60, wherein the structural element includes a window and the opening is a hole prefabricated in the window.

Example 64 includes the system of Example 60, wherein the structural element includes a window and the opening is a hole fabricated in the window when the repeater and antenna are installed on the window.

Example 65 includes the system of Example 60, further comprising a conductive film configured to be disposed between the first repeater and the second repeater.

Example 66 includes a system comprising: a first repeater including, a first wireless power unit having a first wireless power coupler configured to wirelessly transmit a portion of Direct Current (DC) or Alternating Current (AC) electrical power received from a power source; and a first bi-directional amplifier, configured to amplify one or more RF communication signals, wherein the first bi-directional amplifier is powered by the power source; a second repeater including, a second wireless power unit having a second wireless power coupler configured to receive the wireless power, and the second wireless power unit is configured to convert the wireless power to DC or AC electrical power, and a second bi-directional amplifier, configured to amplify the one or more RF communication signals, wherein the second bi-directional amplifier is powered by the DC or AC electrical power from the second wireless power unit; a structural element disposed between the first repeater and the second repeater; and a conductive material integral to the structural element configured to be disposed between the first repeater and the second repeater, wherein the conductive material includes one or more openings configured to be disposed between the first wireless power coupler and the second wireless power coupler.

Example 67 includes the system of Example 66, wherein the conductive material comprises one or more of a film, a glazing, or a wired mesh.

Example 68 includes the system of Example 66, wherein, the first wireless power unit includes, a wireless power transmitter configured to convert the portion of DC or AC electrical power received from the power source to a RF power signal; and the first power coupler, coupled to the wireless power transmitter, configured to transmit the RF power signal; the second wireless power unit includes, the second power coupler configured to receive the RF power signal; and a wireless power receiver, coupled to the second power coupler, configured to convert the received RF power signal to the DC or AC electrical power.

Example 69 includes the system of Example 68, wherein, the first power coupler includes an inductive coil or a capacitive electrode; and the second power coupler includes an inductive coil or a capacitive electrode.

Example 70 includes the system of Example 66, further comprising: a first shielding path between the first power coupler and the structural element; and a second shielding path between the second power coupler and the structural element.

Example 71 includes the system of Example 70, wherein the first shielding path and the second shielding path have a substantially similar shape as the opening disposed between the first wireless power coupler and the second wireless power coupler to form a communication path between the first power coupler and the second power coupler.

Example 72 includes the system of Example 66, wherein, the first wireless power unit includes an optical power transmitter configured to convert the portion of DC or AC electrical power received from the power source to an optical signal and transmit the optical signal; and the second wireless power unit includes an optical power receiver configured to receive the optical signal and convert the optical signal to the DC or AC electrical power.

Example 73 includes the system of Example 66, further comprising: the first repeater further including, a first RF coupling antenna coupled to the first bi-directional amplifier; the second repeater further including, a second RF coupling antenna coupled to the second bi-directional amplifier.

Example 74 includes the system of Example 73, wherein the conductive material includes one or more openings configured to be disposed between the first RF coupling antenna and the second RF coupling antenna.

Example 75 includes the system of Example 74, further comprising: a first shielding path between the first RF coupling antenna and the structural element; and a second shielding path between the second RF coupling antenna and the structural element.

Example 76 includes the system of Example 75, wherein the first shielding path and the second shielding path have a substantially similar shape as the opening disposed between the first RF coupling antenna and the second RF coupling antenna to form a communication path between the first RF coupling antenna and the second RF coupling antenna.

Example 77 includes the system of Example 66, wherein the conductive material is attached to a structural element disposed between the first repeater and the second repeater.

Example 78 includes the system of Example 66, wherein the conductive material is substantially transparent.

Example 79 includes the system of Example 66, wherein the conductive material comprises a material of thin metal wires.

Example 80 includes the system of Example 66, further comprising: the first repeater further including, a first transmission antenna coupled to a transmission port of the first bi-directional amplifier; the second repeater further including, a second transmission antenna coupled to a transmission port of the second bi-directional amplifier.

Example 81 includes the system of Example 66, wherein, the first transmission antenna is a directional antenna; and the second transmission antenna is a directional antenna.

Example 82 includes the system of Example 66, wherein, the first transmission antenna is an omni-directional antenna; and the second transmission antenna is a directional antenna.

Example 83 includes the system of Example 66, wherein, the first repeater comprises a first Single-Input-Single-Output (SISO) repeater; and the second repeater comprises a second SISO repeater.

Example 84 includes the system of Example 66, wherein the first bi-directional amplifier is configured to compensate for RF transmission loss across a structural element disposed between the first and second repeaters.

Example 85 includes the system of Example 66, wherein the second bi-directional amplifier is configured to compensate for RF transmission loss across a structural element disposed between the first and second repeaters.

Example 86 includes a system comprising: a first repeater including, an optical power transmitter configured to convert a portion of Direct Current (DC) or Alternating Current (AC) electrical power received from a power source to an optical signal and transmit the optical signal; a first RF coupling antenna; and a first bi-directional amplifier, coupled to the first RF coupling antenna and configured to amplify one or more RF communication signals, wherein the first bi-directional amplifier is powered by the power source; and a second repeater including, an optical power receiver configured to receive the optical signal, and convert the optical signal to DC or AC electrical power; a second RF coupling antenna; and a second bi-directional amplifier, coupled to the second RF coupling antenna and configured to amplify the one or more RF communication signals, wherein the second bi-directional amplifier is powered by the DC or AC electrical power from the second wireless power unit.

Example 87 includes the system of Example 86, further comprising: a conductive material configured to be disposed between the first repeater and the second wireless repeater.

Example 88 includes the system of Example 86, further comprising: one or more processors and memory configured to: configure the optical power transmitter to initially transmit at a predetermined low power level; determine if the optical power receiver is aligned with the optical power transmitter to receive the optical signal; configure the optical power transmitter to transmit at a predetermined high power level if the optical power receiver is determined to be aligned with the optical power transmitter to receive the optical signal.

Example 89 includes the system of Example 86, wherein the conductive material includes one or more openings configured to be disposed between the first RF coupling antenna of the first repeater and the second RF coupling antenna of the second repeater, and between optical power transmitter and the optical power receiver.

Example 90 includes the system of Example 86, further comprising: a first transmission antenna coupled to the first bi-directional amplifier, wherein the first transmission antenna is a directional antenna internally integral to the first repeater; and a second transmission antenna couple to the second bi-direction amplifier, wherein the second transmission antenna is an omni-directional antenna externally integral to the first repeater.

Example 91 includes a system comprising: a first wireless relay including, a first transmission antenna; a first RF coupling antenna; and a first repeater coupled to the first RF coupling antenna and configured to amplify one or more RF communication signals; a second wireless relay including, a second transmission antenna, a second RF coupling antenna; and a second repeater coupled to the second RF coupling antenna and configured to amplify the one or more RF communication signals; and a conductive material configured to be disposed between the first wireless relay and the second wireless relay.

Example 92 includes the system of Example 91, wherein the conductive material is integral to a structural element disposed between the first wireless relay and the second wireless relay.

Example 93 includes the system of Example 92, wherein an opening in the structural element is prefabricated into the structural element.

Example 94 includes the system of Example 92, wherein an opening in the structural element is fabricated into the structural element when the repeater and antenna are installed on the structural element.

Example 95 includes the system of Example 92, wherein the structural element includes a window and an opening is a hole prefabricated in the window.

Example 96 includes the system of Example 92, wherein the structural element includes a window and an opening is a hole fabricated in the window when the repeater and antenna are installed on the window.

Example 97 includes the system of Example 91, wherein the conductive material includes one or more openings configured to be disposed between the first RF coupling antenna of the first wireless relay and the second RF coupling antenna of the second wireless relay.

Example 98 includes the system of Example 91, wherein the conductive material is substantially transparent.

Example 99 includes the system of Example 91, wherein the conductive material comprises thin metal wires.

Example 100 includes the system of Example 91, further comprising: the first wireless relay further including, the first transmission antenna coupled to a transmission port of the first repeater; the second wireless relay further including, the second transmission antenna coupled to a transmission port of the second repeater.

Example 101 includes the system of Example 91, wherein, the first transmission antenna is a directional antenna; and the second transmission antenna is a directional antenna.

Example 102 includes the system of Example 91, wherein, the first transmission antenna is an omni-directional antenna; and the second transmission antenna is a directional antenna.

Example 103 includes the system of Example 91, wherein, the first wireless relay comprises a first Single-Input-Single-Output (SISO) repeater; and the second wireless relay comprises a second SISO repeater.

Example 104 includes the system of Example 91, wherein the first repeater is configured to compensate for RF transmission loss across a structural element disposed between the first and second wireless relays.

Example 105 includes the system of Example 91, wherein the second repeater is configured to compensate for RF transmission loss across a structural element disposed between the first and second wireless relays.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A system comprising:
a first repeater including,
   a first wireless power unit having a first wireless power coupler configured to wirelessly transmit a portion of Direct Current (DC) or Alternating Current (AC) electrical power received from a power source; and
   a first bi-directional amplifier, configured to amplify one or more RF communication signals, wherein the first bi-directional amplifier is powered by the power source;
a second repeater including,
   a second wireless power unit having a second wireless power coupler configured to receive the wireless power, and the second wireless power unit is configured to convert the wireless power to DC or AC electrical power, and
   a second bi-directional amplifier, configured to amplify the one or more RF communication signals and set a system noise figure, wherein the second bi-directional amplifier is powered by the DC or AC electrical power from the second wireless power unit;
a structural element disposed between the first repeater and the second repeater; and a conductive material integral to the structural element configured to be disposed between the first repeater and the second repeater, wherein the conductive material includes one or more openings configured to be disposed between the first wireless power coupler and the second wireless power coupler.

2. The system of claim 1, wherein the conductive material comprises one or more of a film, a glazing, or a wired mesh.

3. The system of claim 1, wherein,
the first wireless power unit includes,
   a wireless power transmitter configured to convert the portion of DC or AC electrical power received from the power source to a RF power signal; and
   the first power coupler, coupled to the wireless power transmitter, configured to transmit the RF power signal;
the second wireless power unit includes,
   the second power coupler configured to receive the RF power signal; and
   a wireless power receiver, coupled to the second power coupler, configured to convert the received RF power signal to the DC or AC electrical power.

4. The system of claim 3, wherein,
the first power coupler includes an inductive coil or a capacitive electrode; and
the second power coupler includes an inductive coil or a capacitive electrode.

5. The system of claim 1, further comprising:
a first shielding path between the first power coupler and the structural element; and
a second shielding path between the second power coupler and the structural element.

6. The system of claim 5, wherein the first shielding path and the second shielding path have a substantially similar shape as the opening disposed between the first wireless power coupler and the second wireless power coupler to form a communication path between the first power coupler and the second power coupler.

7. The system of claim 1, wherein,
the first wireless power unit includes an optical power transmitter configured to convert the portion of DC or AC electrical power received from the power source to an optical signal and transmit the optical signal; and
the second wireless power unit includes an optical power receiver configured to receive the optical signal and convert the optical signal to the DC or AC electrical power.

8. The system of claim 1, further comprising:
the first repeater further including,
   a first RF coupling antenna coupled to the first bi-directional amplifier;
the second repeater further including,
   a second RF coupling antenna coupled to the second bi-directional amplifier.

9. The system of claim 8, wherein the conductive material includes one or more openings configured to be disposed between the first RF coupling antenna and the second RF coupling antenna.

10. The system of claim 9, further comprising:
a first shielding path between the first RF coupling antenna and the structural element; and
a second shielding path between the second RF coupling antenna and the structural element.

11. The system of claim 10, wherein the first shielding path and the second shielding path have a substantially similar shape as the opening disposed between the first RF coupling antenna and the second RF coupling antenna to form a communication path between the first RF coupling antenna and the second RF coupling antenna.

12. The system of claim 1, wherein the conductive material is attached to a structural element disposed between the first repeater and the second repeater.

13. The system of claim 1, wherein the conductive material is substantially transparent, with a visible light transmittance of greater than or equal to severity percent.

14. The system of claim 1, wherein the conductive material comprises a material comprised of thin metal wires.

15. The system of claim 1, further comprising:
the first repeater further including,
a first transmission antenna coupled to a transmission port of the first bi-directional amplifier;
the second repeater further including,
a second transmission antenna coupled to a transmission port of the second bi-directional amplifier.

16. The system of claim 1, wherein,
the first transmission antenna is a directional antenna; and
the second transmission antenna is a directional antenna.

17. The system of claim 1, wherein,
the first transmission antenna is an omni-directional antenna; and
the second transmission antenna is a directional antenna.

18. The system of claim 1, wherein,
the first repeater comprises a first Single-Input-Single-Output (SISO) repeater; and
the second repeater comprises a second SISO repeater.

19. The system of claim 1, wherein the first bi-directional amplifier is configured to compensate for RF transmission loss across a structural element disposed between the first and second repeaters.

20. The system of claim 1, wherein the second bi-directional amplifier is configured to compensate for RF transmission loss across a structural element disposed between the first and second repeaters.

21. A system comprising:
a first wireless relay including,
- a first transmission antenna;
- a first RF coupling antenna; and
- a first repeater coupled to the first RF coupling antenna and configured to amplify one or more RF communication signals;

a second wireless relay including,
- a second transmission antenna,
- a second RF coupling antenna; and
- a second repeater coupled to the second RF coupling antenna and configured to amplify the one or more RF communication signals and set a system noise figure; and a conductive material configured to be disposed between the first wireless relay and the second wireless relay, wherein one or more of:
- the conductive material is substantially transparent; or
- the conductive material comprises thin metal wires.

22. The system of claim 21, wherein the conductive material is integral to a structural element disposed between the first wireless relay and the second wireless relay.

23. The system of claim 22, wherein an opening in the structural element is prefabricated into the structural element.

24. The system of claim 22, wherein an opening in the structural element is fabricated into the structural element when the repeater and antenna are installed on the structural element.

25. The system of claim 22, wherein the structural element includes a window and an opening is a hole prefabricated in the window.

26. The system of claim 22, wherein the structural element includes a window and an opening is a hole fabricated in the window when the repeater and antenna are installed on the widow.

27. The system of claim 21, wherein the conductive material includes one or more openings configured to be disposed between the first RF coupling antenna of the first wireless relay and the second RF coupling antenna of the second wireless relay.

28. The system of claim 21, wherein the conductive material is substantially transparent with a visible light transmittance of greater than or equal to seventy percent.

29. The system of claim 21, further comprising:
the first wireless relay further including,
the first transmission antenna coupled to a transmission port of the first repeater;
the second wireless relay further including,
the second transmission antenna coupled to a transmission port of the second repeater.

30. The system of claim 21, wherein,
the first transmission antenna is a directional antenna; and
the second transmission antenna is a directional antenna.

31. The system of claim 21, wherein,
the first transmission antenna is an omni-directional antenna; and
the second transmission antenna is a directional antenna.

32. The system of claim 21, wherein,
the first wireless relay comprises a first Single-Input-Single-Output (SISO) repeater; and
the second wireless relay comprises a second SISO repeater.

33. The system of claim 21, wherein the first repeater is configured to compensate for RF transmission loss across a structural element disposed between the first and second wireless relays.

34. The system of claim 21, wherein the second repeater is configured to compensate for RF transmission loss across a structural element disposed between the first and second wireless relays.

35. A system comprising:
a first wireless relay including,
- a first transmission antenna;
- a first RF coupling antenna; and
- a first repeater coupled to the first RF coupling antenna and configured to amplify one or more RF communication signals;

a second wireless relay including,
- a second transmission antenna,
- a second RF coupling antenna; and
- a second repeater coupled to the second RF coupling antenna and configured to amplify the one or more RF communication signals and set a system noise figure;

a conductive material configured to be disposed between the first wireless relay and the second wireless relay; and the first wireless relay including,
- a first wireless power unit having a first wireless power coupler configured to wirelessly transmit a portion of Direct Current (DC) or Alternating Current (AC) electrical power received from a power source; and the second wireless relay including,
- a second wireless power unit having a second wireless power coupler configured to receive the wireless power, and the second wireless power unit is configured to convert the wireless power to DC or AC electrical power.

36. The system of claim 35, wherein the conductive material includes one or more openings configured to be disposed between the first wireless power coupler and the second wireless power coupler.

* * * * *